United States Patent
Løseth et al.

(10) Patent No.: US 9,069,096 B2
(45) Date of Patent: Jun. 30, 2015

(54) METHOD OF PROCESSING MARINE CSEM DATA

(75) Inventors: Lars Løseth, Trondheim (NO); Lasse Amundsen, Trondheim (NO)

(73) Assignee: STATOIL PETROLEUM AS, Stavanger (NO)

( * ) Notice: Subject to any disclaimer, the term of this patent is extended or adjusted under 35 U.S.C. 154(b) by 648 days.

(21) Appl. No.: 12/594,735

(22) PCT Filed: Apr. 2, 2008

(86) PCT No.: PCT/EP2008/053931
§ 371 (c)(1),
(2), (4) Date: Feb. 1, 2010

(87) PCT Pub. No.: WO2008/122554
PCT Pub. Date: Oct. 16, 2008

(65) Prior Publication Data
US 2010/0148784 A1    Jun. 17, 2010

(30) Foreign Application Priority Data

Apr. 5, 2007 (GB) .................................. 0706659.0

(51) Int. Cl.
*G01V 3/12* (2006.01)
*G01V 3/08* (2006.01)

(52) U.S. Cl.
CPC . *G01V 3/12* (2013.01); *G01V 3/083* (2013.01)

(58) Field of Classification Search
CPC .................................. G01V 3/083; G01V 3/12
USPC .................. 324/337, 334, 350, 345, 365, 357
See application file for complete search history.

(56) References Cited

U.S. PATENT DOCUMENTS

| | | | |
|---|---|---|---|
| 5,453,958 | A | 9/1995 | Neff |
| 5,838,634 | A | 11/1998 | Jones et al. |
| 5,844,564 | A | 12/1998 | Bennis et al. |
| 6,038,389 | A | 3/2000 | Rahon et al. |
| 6,907,392 | B2 | 6/2005 | Bennis et al. |
| 6,978,210 | B1 | 12/2005 | Suter et al. |
| 7,006,959 | B1 | 2/2006 | Huh et al. |
| 7,047,165 | B2 | 5/2006 | Balaven et al. |
| 7,096,122 | B2 | 8/2006 | Han |
| 7,207,395 | B2 | 4/2007 | Zupanick |

(Continued)

FOREIGN PATENT DOCUMENTS

GB          2 423 370 A          8/2006

OTHER PUBLICATIONS

Eidesmo et al. "Sea Bed Logging (SBL), a new method for remote and direct identification of hydrocarbon filled layers in deepwater areas" first break vol. 20, No. 3, p. 144-152 (Mar. 2002).*

(Continued)

*Primary Examiner* — Tung X Nguyen
*Assistant Examiner* — Alesa Allgood
(74) *Attorney, Agent, or Firm* — Patterson Thuente Pedersen, P.A.

(57) ABSTRACT

A method is provided for processing marine controlled source electromagnetic data. Inline and broadside marine controlled source electromagnetic data are provided, for example by means of one or more horizontal electric dipoles and one or more receivers disposed in a water column above a subsurface to be surveyed. A linear combination of the inline and broadside data is formed so as to reduce the airwave content.

16 Claims, 15 Drawing Sheets

(56) References Cited

U.S. PATENT DOCUMENTS

| | | | |
|---|---|---|---|
| 7,362,102 B2 * | 4/2008 | Andreis | 324/365 |
| 7,369,973 B2 | 5/2008 | Kennon et al. | |
| 7,454,322 B2 | 11/2008 | Carpentier et al. | |
| 7,617,083 B2 | 11/2009 | Bennis et al. | |
| 7,634,395 B2 | 12/2009 | Flandrin et al. | |
| 7,969,152 B2 * | 6/2011 | Velikhov et al. | 324/335 |
| 2001/0006387 A1 | 7/2001 | Bennis et al. | |
| 2002/0032494 A1 | 3/2002 | Kennon et al. | |
| 2002/0038201 A1 | 3/2002 | Balaven et al. | |
| 2005/0015228 A1 | 1/2005 | Carpentier et al. | |
| 2005/0125203 A1 | 6/2005 | Hartman | |
| 2005/0273303 A1 | 12/2005 | Flandrin et al. | |
| 2007/0073527 A1 | 3/2007 | Flandrin et al. | |
| 2009/0265152 A1 | 10/2009 | Cacas et al. | |

OTHER PUBLICATIONS

Eidesmo, T., et al., "Sea Bed Logging (SBL), a new method for remote and direct identification of hydrocarbon filled layers in deepwater areas," *first break*, vol. 20, No. 3, pp. 144-152 (Mar. 2002).

Bennis et al., "One More Step in Gocad Stratigraphic Grid Generation: Taking into Account Faults and Pinchouts<" Society of Petroleum Engineers, 1996. pp. 307-315.

UK Search Report dated Jan. 7, 2010, for Application No. GB 0916544.0.

U.S. Appl. No. 12/563,810 dated Sep. 21, 2009.

\* cited by examiner

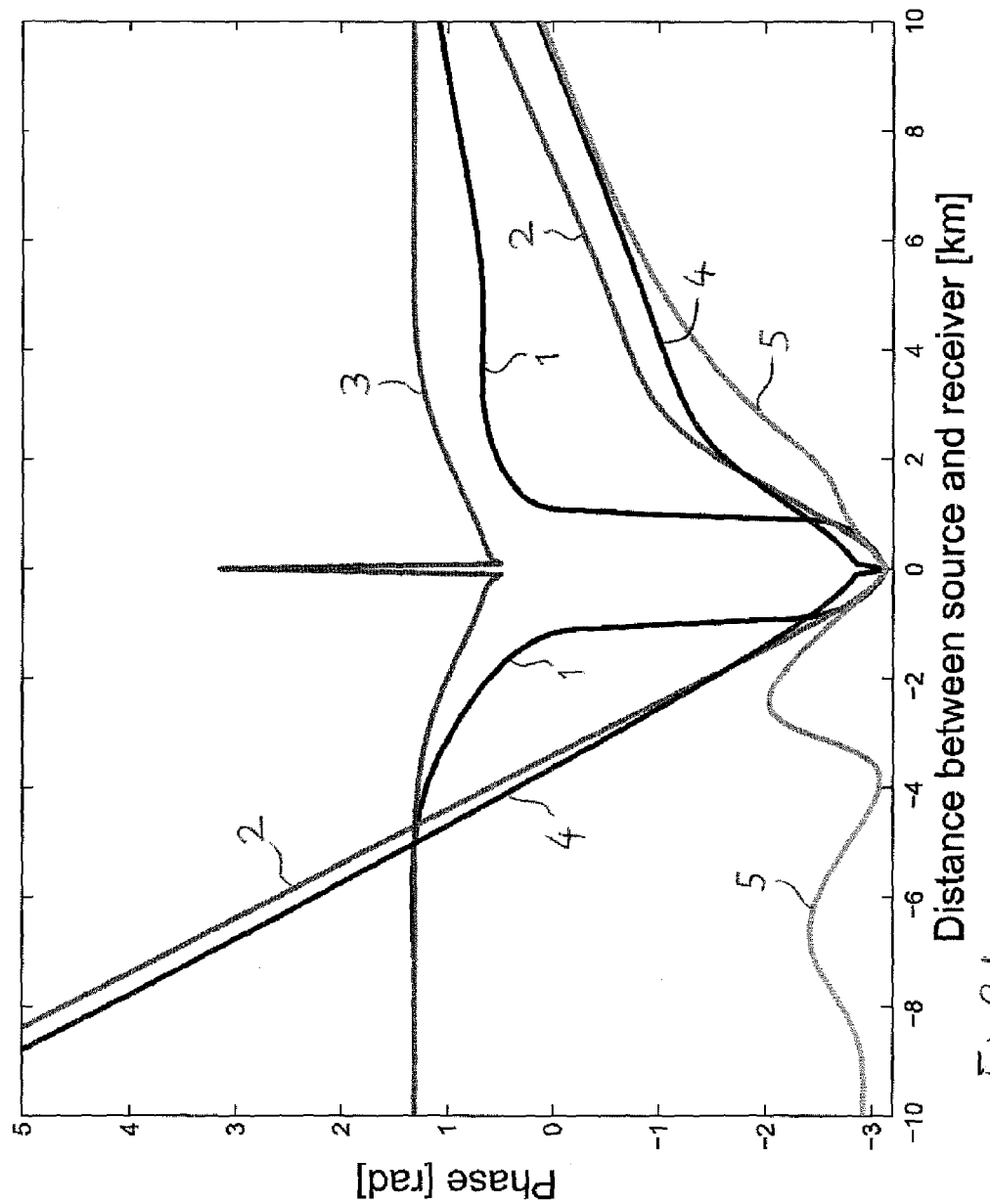

METHOD OF PROCESSING MARINE CSEM DATA

PRIORITY CLAIM

The present application is a National Phase entry of PCT Application No. PCT/EP2008/053931, filed Apr. 2, 2008, which claims priority from Great Britain Application Number 0706659.0, filed Apr. 5, 2007, the disclosures of which are hereby incorporated by reference herein in their entirety.

FIELD OF THE INVENTION

The present invention relates to a method of processing marine controlled source electromagnetic (CSEM) data obtained from CSEM surveying which is also known as Seabed Logging (SBL). Such surveying may be used, for example, to search for hydrocarbon reserves or to monitor known hydrocarbon resources.

BACKGROUND OF THE INVENTION

A motivation for removing the airwave in marine CSEM data is as follows: In marine CSEM or SBL one looks for thin resistive layers in conductive sediments by using a horizontal electric dipole (HED) source that emits strong electromagnetic fields into the surroundings. The source is towed close to the seabed and the low-frequency signals are recorded by receivers that are situated on the seabed (Eidesmo et al., 2002). The principle behind marine CSEM/SBL is simple; hydrocarbons in the subsurface appear to low-frequency electromagnetic fields as thin resistive layers within more conductive sediments. Hydrocarbons can thus in principle be directly detected by transmitting electromagnetic fields into the subsurface and recording the returning signal that has been guided in the thin resistive layer. However, in shallow water, the lateral field propagation in the air halfspace becomes significant, and may dominate the recorded signals at the receivers.

The signal that travels through air is often referred to as the source-induced "airwave" or "air-response." Since the subsurface responses are present in the data even if they are dominated by the air-response, the air-responses can be included in inversion schemes. However, it can often be advantageous to separate the air-response from the subsurface data in order to simplify the interpretation and to make the migration and inversion schemes more efficient.

Several methods have been proposed to separate the air-response from the subsurface signal. One proposed solution is to generate synthetic data in a two-halfspace model with seawater and air in order to subtract the synthetic data from the real data for the relevant source-receiver geometries (Lu et al., 2005). Another method is to apply electromagnetic field decomposition into upgoing and downgoing components just below the seabed as suggested by Amundsen et al., (2006). Instead of, or in addition to, decomposing the electromagnetic field into upgoing and downgoing field components, the field can be split into a transverse electric (TE) part and a transverse magnetic (TM) part.

It is known that the subsurface response from a thin resistive layer is due to a TM-polarized refracted response whereas the air-response is dominated by a TE-mode lateral wave (cf. Løseth, 2007). That the TM mode is sensitive to a thin resistive layer is one of the main points in Eidesmo et al. (2002). Since the vertical electric field component from a HED is a pure TM mode, one could measure this component in order to avoid the TE-mode air-response. The air-response could likewise be avoided by using a vertical electric dipole (VED) since this source configuration generates TM modes only. However, since the HED is able to induce larger subsurface responses than the VED, and since horizontal field components are more easily measured than vertical field components with present surveying techniques, the air-response removal from horizontal field components due to an HED source is an issue of great interest in hydrocarbon exploration with the marine CSEM/SBL method. Although it is common in conventional surveying to collect inline data only, it is known that access to both inline and broadside data can provide additional information (e.g. Eidesmo et al., (2002).

SUMMARY OF THE INVENTION

According to a first aspect of the invention, there is provided a method of processing marine controlled source electromagnetic data, comprising the steps of providing inline and broadside marine controlled source electromagnetic data and forming a linear combination of the inline and broadside data to reduce the airwave content.

The inline and broadside data may comprise inline and broadside electric data. The forming step may comprise forming the difference between the inline electric data and the weighted broadside electric data which is weighted by a first weighting factor. The first weighting factor may be equal or proportional to the inline dipole moment of an electromagnetic source used to obtain the inline electric data divided by twice the broadside dipole moment of an electromagnetic source used to obtain the broadside electric data.

The inline and broadside data may comprise inline and broadside magnetic data. The forming step may comprise forming the sum of the inline magnetic data and the weighted broadside magnetic data, which is weighted by a second weighting factor. The second weighting factor may be equal or proportional to the inline dipole moment of an electromagnetic source used to obtain the inline magnetic data divided by twice the broadside dipole moment of an electromagnetic source used to obtain the broadside magnetic data.

The inline and broadside data may be obtained from a common controlled electromagnetic source. The common source may comprise a horizontal electric dipole whose dipole moment is oriented with respect to the inline direction at an angle which is different from zero and every interger multiple of $\pi/2$ radians. The inline and broadside dipole moments may comprise the inline and broadside components, respectively, of the dipole moment.

The providing step may comprise rotating horizontal electromagnetic field component data to provide the inline and broadside data.

According to a second aspect of the invention, there is provided a computer program arranged to control a computer to perform a method according to the first aspect of the invention.

According to a third aspect of the invention, there is provided a computer-readable medium containing a program according to the second aspect of the invention.

According to a fourth aspect of the invention, there is provided transmission of a program according to the second aspect of the invention across a network.

According to a fifth aspect of the invention, there is provided a computer containing or programmed by a program according to the second aspect of the invention.

In the present context, inline data means an electric field component having a direction along a horizontal "offset line" between a source and a receiver and/or a magnetic field component orthogonal to the offset line. Similarly, broadside data means an electric field component having a direction orthogonal to the horizontal offset line between the source and the receiver and/or a magnetic field component having a direction along the offset line.

The data may be provided by one or more sources with the inline and broadside data being measured simultaneously or at different times. Each source may comprise a single or multi-component horizontal electric dipole. In the case where a single source is used and inline and broadside components are measured simultaneously, the source is required to have non-zero inline and broadside dipole moments. For example, in the case of a horizontal electric dipole, the dipole moment is required to be orientated at an angle which is non-zero and non-perpendicular to the offset line.

If the inline and broadside data are obtained from different sources, the propagation paths between the sources and the or each receiver should be similar, for example differing only such that any differences are below a noise threshold of the measurement process. In general, the receivers will be capable of measuring inline and broadside components but it is also possible for different receivers to measure the components provided the receivers are sufficiently close together for the electro magnetic waves to have followed substantially the same propagation paths.

It is thus possible to provide a technique which allows the airwave contribution to a CSEM survey to be substantially removed or reduced. The resulting processed data provide an improved detection or estimation of hydrocarbon reserves. Further processing of the data may thus be simplified and/or the quality of the data may be improved.

BRIEF DESCRIPTION OF THE DRAWINGS

The invention will be further described, by way of example, with reference to the accompanying drawings, in which:

FIGS. 9a and 9b are graphs illustrating MVO and PVO, respectively, for magnetic field responses in the simple model;

Figure 1:
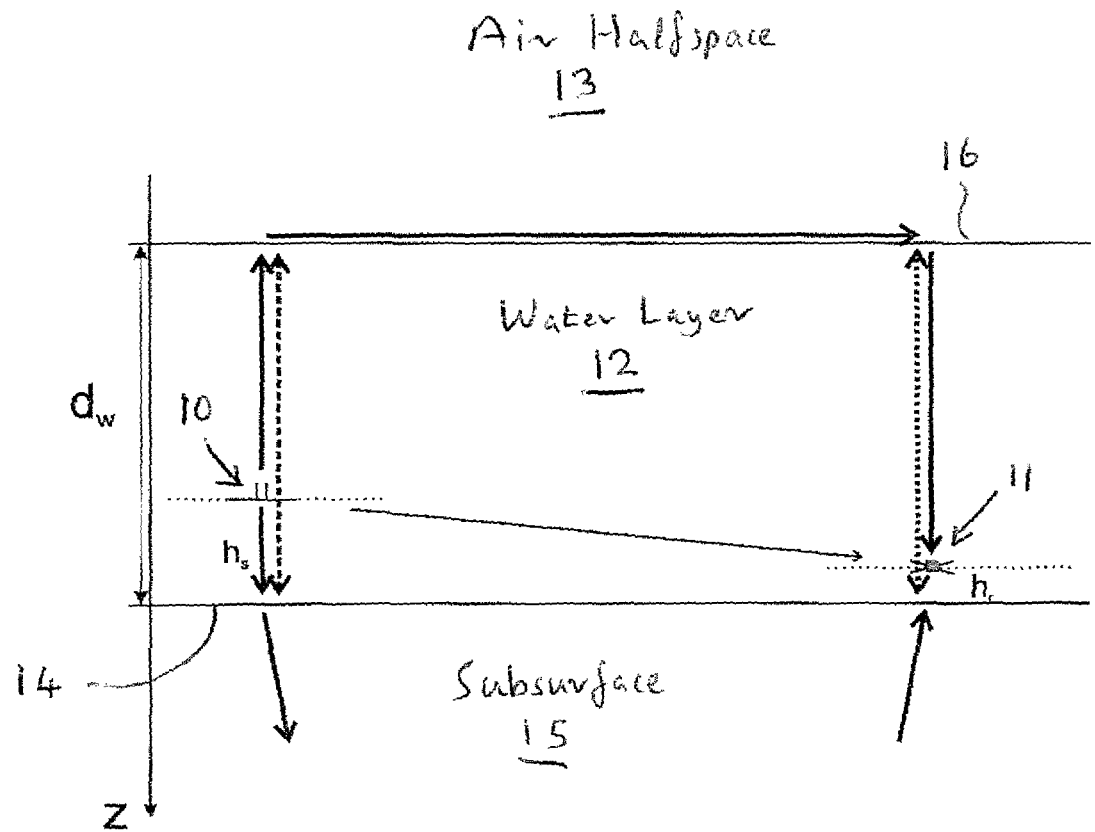
FIG. 1 is a diagram illustrating electromagnetic signal propagation in a stratified model of the Earth.

While the present invention is amenable to various modifications and alternative forms, specifics thereof have been shown by way of example in the drawings and will be described in detail. It should be understood, however, that the intention is not to limit the present invention to the particular embodiments described. On the contrary, the intention is to cover all modifications, equivalents, and alternatives falling within the spirit and scope of the present invention.

DETAILED DESCRIPTION OF THE DRAWINGS

A main goal in marine controlled source electromagnetic (CSEM) surveying for hydrocarbons, also called SeaBed Logging (SBL), is to detect and describe possible thin resistive layers within the conductive surroundings beneath the seabed. In shallow water, the response from the air halfspace often masks the response from the subsurface. In the following a new method for removing the air-response from marine CSEM data is described. The methodology requires that the position and rotation (or orientation) of the receivers are known, and that the source has two components in the horizontal plane when decomposed into one component in the direction of the line between the receiver and source locations and one component normal to this direction. The method thus involves a one-component or multicomponent horizontal electric dipole (HED), and receivers that can measure the electric and magnetic field components in the horizontal plane.

A methodology and how the method can be performed on real data are first described. The theoretical foundation of the method is later described, and can be summarized as follows: The spatial expressions for the air-response derived by using asymptotic evaluation of the CSEM integrals show that the air-response is predominantly a TE-mode response which has similar behavior for an inline and broadside source/receiver configuration. The subsurface data, on the other hand, differs substantially for the inline and broadside configurations. Thus, by summing or differencing a proper weighting of the inline and broadside data, the predominant air-response can be removed from collected data if both inline and broadside data are acquired. Inline data means electric field components that have a direction along the horizontal offset line between a source and receiver, and magnetic field components that are orthogonal to this line. The source is (or has a component which is) pointing in the direction of the offset line. Broadside means electric field components that have a direction orthogonal to the horizontal offset line between a source and receiver, and magnetic field components that are in the direction along this line. The source is (or has a component which is) in this case pointing in an orthogonal direction to the offset line.

Figure 3:
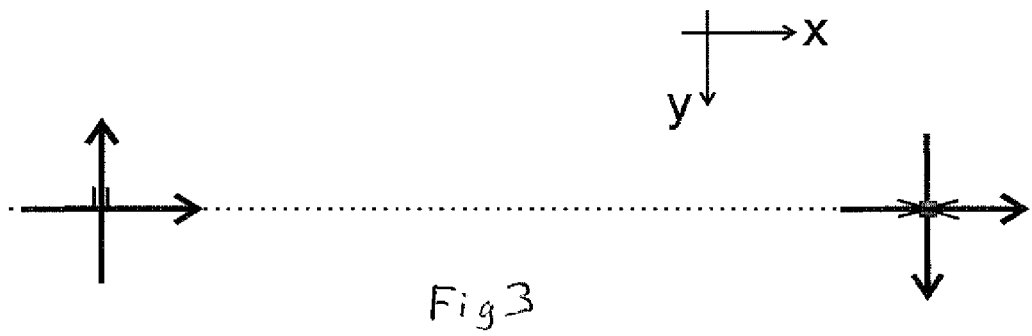
FIG. 3 is a diagram illustrating inline and broadside antenna configurations.

The method may apply to marine electromagnetic data that are generated by a controlled source, and the method can be applied for data due to any kind of source signature, e.g. frequency-domain such as a time-harmonic signal and time-domain such as a pulse signal. The methodology can be summarized as follows:

By decomposing the source and receiver into a first component in the direction along the line between the source and receiver location (the inline direction), and a second component orthogonal to this direction (the broadside direction), cf. FIG. 3, the resulting electric and magnetic field components can be combined into a new set of quantities in a certain way so that the effect of the airwave on the new quantities is removed or substantially reduced. The new quantities thus contain subsurface information that is not contaminated (or at least less contaminated) by the airwave. This data-driven removal procedure for removing the airwave can be performed in the following manner:

(i) Determine the horizontal offset line between the source and receiver (shortest path between source and receiver in the horizontal plane). Denote this as the x-axis in a Cartesian right-handed coordinate system where the z-axis is pointing downwards.

(ii) Rotate the horizontal electromagnetic field components so that one component points in the x-direction and one in the y-direction. Denote the measured components as $E'_x$, $E'_y$, $H'_x$, $H'_y$. Use the known rotation angle $\theta_r$ to the inline direction, cf. FIG. 4, to rotate the data according to the following equations where the quantities $E_\rho^{in}$ and $H_\beta^{in}$ describes the sought for inline quantities and $E_\beta^{br}$ and $H_\rho^{br}$ describes the sought for broadside quantities:

$$E_\rho^{in} = E_x = E'_x \cos\theta_r + E'_y \sin\theta_r, \quad (1a)$$

$$E_\beta^{br} = E_y = -E'_x \sin\theta_r + E'_y \cos\theta_r, \quad (1b)$$

$$H_\rho^{br} = H_x = H'_x \cos\theta_r + H'_y \sin\theta_r, \quad (1c)$$

$$H_\beta^{in} = H_y = -H'_x \sin\theta_r + H'_y \cos\theta_r, \quad (1d)$$

(iii) The new quantities for the electric field $S_E$ and magnetic field $S_H$ are then formed by weighting the broadside components by the weighting factor w and adding or subtracting the weighted broadside components to the inline components as follows:

$$S_E = E_\rho^{in} - w E_\beta^{br}, \quad (2a)$$

$$S_H = H_\beta^{in} + w H_\rho^{br}, \quad (2b)$$

(iv) The weighting factor is:

$$w = \frac{p^{in}}{2 p^{br}}, \quad (3)$$

where $p^{in}$ is the source dipole moment in the inline direction and $p^{br}$ is the source dipole moment in the broadside direction.

Figure 5:
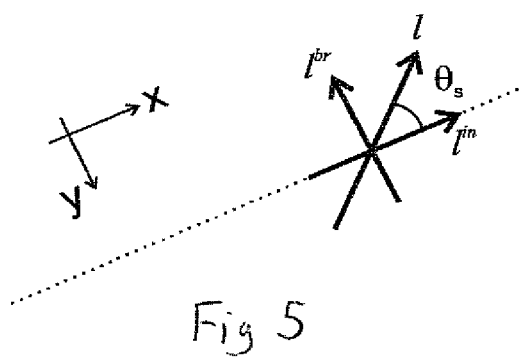
FIG. 5 is a diagram illustrating decomposition of a source.

(v) In order to determine the weighting factor w, the source dipole moment p=Il, where I is the source current and l is the dipole length, which must be pointing in a direction with an angle $\theta_s$ to the inline direction, must be decomposed into its component in the inline direction $p^{in}$ and broadside direction $p^{br}$. This requires that the angle $\theta_s$ cannot be equal to $-\pi$, $-\pi/2$, 0, $\pi/2$, or $\pi$. With reference to FIG. 5, the source decomposition can in this case be described as follows:

$$p^{in} = Il\cos\theta_s, \quad (4a)$$

$$p^{br} = Il\sin\theta_s, \quad (4b)$$

Alternatively, the source can be a multicomponent source, i.e. at least two components in the horizontal plane, that emits a signal with a known quantity in the broadside direction and a known quantity in the inline direction. This source should produce the dipole moments $p^{in}$ and $p^{br}$ at similar source locations, i.e., locations that are sufficiently close to each other to emit inline and broadside signals that travel through the "same" subsurface, i.e. the difference in the resulting measured response from a broadside or inline signal generated within the distance between the slightly dissimilar source locations should be below the noise limit.

EM Fields from a HED

Field equations due to a HED in stratified media are reviewed herein. From explicit spatial expressions for the air-response in a water column, it is shown how the inline and broadside data can be combined to give electric and magnetic field responses at least substantially void of the dominant air-response. The results can be generalized to cases where the seabed and subsurface are not represented as stratified layers. Hence, the method can be used for marine CSEM/SBL data when the seabed has varying topography. Moreover, for surveys where only inline data have been acquired, the presented spatial expressions that represent the dominant air-responses can be used to subtract the air-response from the inline data. In stratified media, the frequency-domain horizontal electromagnetic field components from a horizontal electric dipole (HED) can be written as (Løseth and Ursin, 2007):

$$E_\rho = -\frac{Il}{4\pi}\cos\beta\left[I_{A0}^{TM} + \frac{1}{\rho}(I_{A1}^{TE} - I_{A1}^{TM})\right], \quad (5a)$$

$$E_\beta = -\frac{Il}{4\pi}\sin\beta\left[-I_{A0}^{TE} + \frac{1}{\rho}(I_{A1}^{TE} - I_{A1}^{TM})\right], \quad (5b)$$

$$H_\rho = +\frac{Il}{4\pi}\sin\beta\left[-I_{D0}^{TE} + \frac{1}{\rho}(I_{D1}^{TE} - I_{D1}^{TM})\right], \quad (5c)$$

$$H_\beta = -\frac{Il}{4\pi}\cos\beta\left[I_{D0}^{TM} + \frac{1}{\rho}(I_{D1}^{TE} - I_{D1}^{TM})\right], \quad (5d)$$

where Il is the electric dipole current moment, $\rho$ is the radial distance in the horizontal plane, $\beta$ is the azimuthal angle, and where the medium properties change along the z-direction. The z-axis is pointing downwards. The variables I in equation 5 describe the propagation of a spectrum of plane-wave components for TE and TM modes:

$$I_{A0}^{TE} = \int_0^\infty d\lambda \lambda J_0(\lambda\rho) g_A^{TE}(\lambda), \quad (6a)$$

$$I_{D0}^{TE} = \int_0^\infty d\lambda \lambda J_0(\lambda\rho) g_D^{TE}(\lambda),$$

$$I_{A1}^{TE} = \int_0^\infty d\lambda J_1(\lambda\rho) g_A^{TE}(\lambda), \quad (6b)$$

$$I_{D1}^{TE} = \int_0^\infty d\lambda J_1(\lambda\rho) g_D^{TE}(\lambda),$$

$$I_{A0}^{TM} = \int_0^\infty d\lambda \lambda J_0(\lambda\rho) g_A^{TM}(\lambda), \quad (6c)$$

$$I_{D0}^{TM} = \int_0^\infty d\lambda \lambda J_0(\lambda\rho) g_D^{TM}(\lambda),$$

$$I_{A1}^{TM} = \int_0^\infty d\lambda J_1(\lambda\rho) g_A^{TM}(\lambda), \quad (6d)$$

$$I_{D1}^{TM} = \int_0^\infty d\lambda J_1(\lambda\rho) g_D^{TM}(\lambda),$$

where $\lambda$ is the horizontal wavenumber, and $J_0$ and $J_1$ are the Bessel functions of order zero and one, respectively. When the receivers are within the source layer, the functions in the integral expressions are $$g_A^{TE}(\lambda) = \frac{\omega\mu}{\gamma}[e^{i\gamma h_{rs}} + R_A^{TE}(\lambda)], \quad (7a)$$

$$g_D^{TE}(\lambda) = \text{sgn}(z) e^{i\gamma h_{rs}} + R_D^{TE}(\lambda),$$

$$g_A^{TM}(\lambda) = \frac{\omega\mu\gamma}{\kappa^2}[e^{i\gamma h_{rs}} + R_A^{TM}(\lambda)], \quad (7b)$$

$$g_D^{TM}(\lambda) = \text{sgn}(z) e^{i\gamma h_{rs}} + R_D^{TM}(\lambda),$$

where the first terms on the right hand side describe a direct field (the contribution in a homogeneous medium), the second terms are the reflection responses, and $h_{rs}$ is the vertical distance between the source and the receiver. The parameter ω is the source frequency, μ is the magnetic permeability, and $\tilde{\epsilon}=\epsilon+i\sigma/\omega$ is a complex permittivity that includes both the electric permittivity ϵ and the conductivity σ. The vertical wavenumber is denoted γ and given by $\gamma=\mathrm{sqrt}(k^2-\lambda^2)$, where k is the total wavenumber. The sign of the square root must be chosen so that Im(γ)>0 in order to satisfy the radiation condition. The wavenumber in terms of electromagnetic properties and frequency is $$k=\sqrt{\omega^2\mu\epsilon+i\omega\mu\sigma}. \quad (8)$$

In air, the wavenumber reduces to $$k_0=\omega\sqrt{\mu_0\epsilon_0}, \quad (9)$$

where the subscript 0 is used to denote the air halfspace, $\epsilon_0$ is the free-space permittivity, and $\mu_0$ is the free-space permeability. In seawater, the low-frequency wavenumber approximation for conductive media is used which means that $$k = \frac{1+i}{\sqrt{2}}\sqrt{\omega\mu_0\sigma}. \quad (10)$$

FIG. 1 shows a schematic drawing of a source 10 and receiver antenna 11 in a water layer 12. Above the water layer there is an air halfspace 13, and the region below the seabed interface 14 is referred to as the subsurface 15. The subsurface 15 can consist of several layers. The reflection coefficient between air and seawater is denoted $r_0$ and the reflection response from the subsurface just above the seabed interface is denoted $R_{sb}$. The overall reflection response in the seawater layer can then be written as $$R_A = \frac{R_{sb}e^{i\gamma(h_s+h_r)} + r_0 e^{i\gamma(2d_w-h_s-h_r)} + r_0R_{sb}e^{i\gamma(2d_w-h_s+h_r)} + r_0R_{sb}e^{i\gamma(2d_w+h_s-h_r)}}{1-r_0R_{sb}e^{2i\gamma d_w}}, \quad (11a)$$

$$R_D = \frac{-R_{sb}e^{i\gamma(h_s+h_r)} + r_0 e^{i\gamma(2d_w-h_s-h_r)} - r_0R_{sb}e^{i\gamma(2d_w-h_s+h_r)} + r_0R_{sb}e^{i\gamma(2d_w+h_s-h_r)}}{1-r_0R_{sb}e^{2i\gamma d_w}}, \quad (11b)$$

where $h_r$ is the receiver height, $h_s$ is the source height, and $d_w$ is the water depth. As shown in Løseth (2007), these expressions can be rewritten in terms of the reflection coefficient from the sea-surface and additional multiples due to the interaction with the seabed interface:

$$R_A = r_0 e^{i\gamma(d_s+d_r)}[1+R_{sb}e^{2i\gamma h_s}][1+R_{sb}e^{2i\gamma d_r}][1+r_0R_{sb}e^{2i\gamma d_w}+\ldots]+R_{sb}e^{i\gamma(h_s+h_r)}, \quad (12a)$$

$$R_D = r_0 e^{i\gamma(d_s+d_r)}[1+R_{sb}e^{2i\gamma h_s}][1-R_{sb}e^{2i\gamma h_r}][1+r_0R_{sb}e^{2i\gamma d_w}+\ldots]-R_{sb}e^{i\gamma(h_s+h_r)}, \quad (12b)$$

where the depth parameters $d_s$ and $d_r$, describing respectively the source depth ($d_s=d_w-h_s$) and receiver depth ($d_r=d_w-h_r$), have been introduced for simplicity.

Note that in equation 12, the reflection response is a sum of two terms where all the multiples are accounted for in the first term.

The TE- and TM-mode reflection coefficients at an interface are (cf. Løseth et al., 2006):

$$r_{TE} = \frac{\mu_2\gamma_1-\mu_1\gamma_2}{\mu_2\gamma_1+\mu_1\gamma_2} \text{ and } r_{TM} = \frac{\tilde{\epsilon}_1\gamma_2-\tilde{\epsilon}_2\gamma_1}{\tilde{\epsilon}_2\gamma_1+\tilde{\epsilon}_1\gamma_2}, \quad (14)$$

where the subscript 1 refers to material parameters in the region that contains the incident field, and the subscript 2 denotes material parameters on the opposite side of the interface.

TE and TM Modes

The field equations 5 with corresponding reflection responses can be written in terms of TE and TM modes. The decomposition of an electromagnetic field into two sets of orthogonal components for the TE- and TM-polarization modes is performed because the polarization components behave differently when reflected from or transmitted through an interface (cf. equation 14). In addition, in a homogeneous source-free region of space, the electromagnetic field from a HED can be described as the sum of a TE and TM mode with respect to e.g., the z-axis (cf. Morse and Feshbach, 1953; Stamnes, 1986). The definitions of TE and TM components related to the z-direction are in this case $$E_z^{TE}=0, \text{ and } H_z=H_z^{TE}\neq 0, \quad (15a)$$

for TE modes, and $$H_z^{TM}=0, \text{ and } E_z=E_z^{TM}\neq 0, \quad (15b)$$

for TM modes. Thus, $H_z$ does not "see" TM modes, and $E_z$ does not "see" TE modes. It is evident that the horizontal electric and magnetic fields can be written as a superposition of TE and TM fields.

In general, the definitions of TE and TM modes in terms of a fixed axis and in terms of reflection and transmission from a planar interface are different. However, in isotropic (and vertically transverse isotropic) plane-layered media with the stratification in the z-direction, these definitions are equivalent. Thus, in stratified media, the scattered TE mode has no vertical electric field component, the scattered TM mode has no vertical magnetic field component, and the horizontal field expressions can be written as a sum of the incident and reflected TE- and TM-polarized modes.

In structures that deviate from stratification, the definition of TE- and TM-polarization components in terms of reflection and transmission is ambiguous. At a receiver location in a homogeneous region of space, the field can still be separated into two sets of components where one set is defined from $E_z=0$ and the other from $H_z=0$. When this criterion is used as the definition of TE and TM modes, these TE and TM modes will contain responses that are reflected and transmitted as both TE- and TM-polarization components in terms of the TE/TM-definitions for reflection and transmission. For many scenarios in geophysical applications, the assumption of stratified layers can be a good approximation to the geological model. Then, the definitions of TE and TM polarization in terms of vertical field components give modes that correspond to the scattered TE and TM modes, respectively.

Referring to equation 3, the inline component is a TM mode and the broadside component a TE mode at far offsets. However, in marine CSEM and SBL, the near-field is important, so both modes are present in both broadside and inline components. However, in most models, one may expect the TM component to dominate relatively more for the inline configuration, and the TE component to dominate relatively more for the broadside configuration.

Air-Response in a Model with Two Halfspaces

Figure 2:
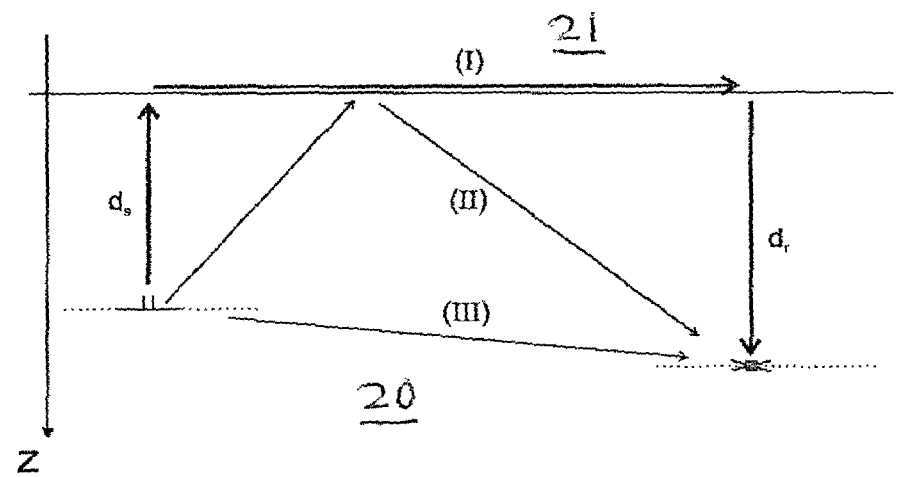
FIG. 2 is a diagram illustrating signal propagation in a two-halfspace model with source and receivers disposed in a conductive seawater region.

Referring to FIG. 2, a seawater halfspace 20 and an air halfspace 21 are depicted where the source and receivers are situated in the seawater region. The signal propagation can be interpreted as a sum of a direct field (path III), a ray-reflection at the sea-surface interface (path II), and a lateral field that has propagated in the air region (path I). Due to the heavy attenuation in seawater, the signal that has propagated in air starts to dominate at source-receiver offsets that are larger than the vertical distance $d_s$ from the source to the sea-surface and sea-surface to the receiver $d_r$. The large resistivity contrast between sea and air also implies that the air-response is induced by a vertically propagating signal from the source to the sea-surface, and that the signal that leaks back to the receiver is also vertically travelling in the seawater.

By evaluating the field integrals in equation 16 by the method of steepest descents, it can be shown that the air-response is almost completely accounted for by the TE-polarized field response. From the calculations in Løseth (2007) it is shown that the air-response can be ascribed to the contribution from a branch-point in the complex integration plane:

$$I_{A0,b}^{TE} \approx -\frac{2e^{ink\rho + ik(d_s+d_r)\sqrt{1-n^2}}}{\sigma\rho^2(1-n^2)} \tag{16a}$$

$$\left[ink + \frac{1}{\rho}\left(-1 + \frac{3}{2}ikh\frac{n^2}{\sqrt{1-n^2}}\right) + \ldots\right]$$

$$I_{A1,b}^{TE} \approx -\frac{2e^{ink\rho + ik(d_s+d_r)\sqrt{1-n^2}}}{\sigma\rho^2(1-n^2)}\left[1 + \frac{3nh}{2\rho\sqrt{1-n^2}} + \ldots\right], \tag{16b}$$

$$I_{D0,b}^{TE} \approx \frac{2e^{ink\rho + ik(d_s+d_r)\sqrt{1-n^2}}}{ik\rho^2\sqrt{1-n^2}} \tag{16c}$$

$$\left[ink + \frac{1}{\rho}\left(-1 + \frac{3n^2}{1-n^2} + \frac{3}{2}ikh\frac{n^2}{\sqrt{1-n^2}}\right) + \ldots\right]$$

$$I_{D1,b}^{TE} \approx \frac{2e^{ink\rho + ik(d_s+d_r)\sqrt{1-n^2}}}{ik\rho^2\sqrt{1-n^2}} \tag{16d}$$

$$\left[1 + \frac{1}{ik\rho}\left(\frac{3n}{1-n^2} + \frac{3}{2}ikh\frac{n}{\sqrt{1-n^2}}\right) + \ldots\right]$$

At the interface between seawater and air, $n \approx 0$ is a good approximation. Then the expressions in equation 16 simplify:

$$I_{A0,b}^{TE} \approx \frac{2e^{ik(d_s+d_r)}}{\sigma\rho^3}, \text{ and } I_{D0,b}^{TE} \approx -\frac{2e^{ik(d_s+d_r)}}{ik\rho^3}, \tag{17}$$

where the first-order integrals have a simple relation to the zeroth-order integrals:

$$I_{A1,b}^{TE} \approx -\rho I_{A0,h}^{TE} \text{ and } I_{D1,b}^{TE} \approx -\rho I_{D0,b}^{TE}. \tag{18}$$

When the expressions in equations 17 and 18 are inserted into equation 5 (the TM modes are negligible), we obtain the well-known field responses for radiation in conductive media in the presence of a nonconductive halfspace as presented in e.g. Baños (1966), Wait (1961), and Bannister (1984).

Air-response in the Seawater Layer

When the source and receiver are situated in a seawater layer that has a stack of subsurface layers below and a sea-surface interface above as depicted in FIG. 1, the responses due to the air region as described in equation 17 are modified due to the presence of the subsurface layers. Equation 12 can be used in order to explain the modification in the TE response: The reflection coefficient at the sea-surface $r_0$ is multiplied by the term $1 + R_{sb}e^{2i\gamma h_s}$ which can be pictured as an amplification of the source signal. The next term, $1 + R_{sb}e^{2i\gamma h_r}$ for the $R_A$-response, can be considered as an added strength to the signal at the receiver. For the $R_D$-response, the latter term contains a negative sign which means that the signal is diminished at the receiver side. The geometric series that follows these terms accounts for additional multiples in the water column, and the last term in equation 12 is small and can be ignored.

The expressions in equation 17 show that the TE air-response can be considered as vertically propagating in the seawater column. Thus, the seabed reflection $R_{sb}$ can be approximated for normal incidence, and the vertical wave-number $\gamma$ can be approximated as $\gamma = k$. For the multiples, the consequence of the reflection coefficient squared, cubed, quadrupled, etc., in the branch-point contribution must be evaluated. This has been done in Løseth (2007) and results in $r_0^2 \approx 2r_0$, $r_0^3 \approx 3r_0$, $r_0^4 \approx 4r_0$, and so on, when $n \approx 0$. When the water-column effects are added to the sea-surface response in equation 17, one thus gets:

$$I_{A0}^{TE} \approx \frac{2e^{ik(d_s+d_r)}}{\sigma\rho^3}[1 + R_{sb}e^{2ikh_s}][1 + R_{sb}e^{2ikh_r}] \tag{19a}$$

$$[1 + 2R_{sb}e^{2ikd_w} + 3R_{sb}^2 e^{4ikd_w} + \ldots],$$

$$I_{D0}^{TE} \approx -\frac{2e^{ik(d_s+d_r)}}{ik\rho^3}[1 + R_{sb}e^{2ikh_s}][1 - R_{sb}e^{2ikh_r}] \tag{19b}$$

$$[1 + 2R_{sb}e^{2ikd_w} + 3R_{sb}^2 e^{4ikd_w} + \ldots],$$

where the relation between the zeroth- and first-order integral as described in equation 17 holds. The expression in the last brackets in equations 19a and 19b can be summed into $$1 + 2R_{sb}e^{2ikd_w} + 3R_{sb}^2 e^{4ikd_w} + \ldots = [1 - R_{sb}e^{2ikd_w}]^{-2}, \tag{20}$$

but because of the attenuation in the water column, only the first few terms in the series expansion are normally needed.

Inline and Broadside Acquisition

In present marine CSEM or SBL surveying, it is common to acquire inline data. It is less common to collect broadside data and, in surveys where this is done, the broadside data are normally sparse.

Figure 4:
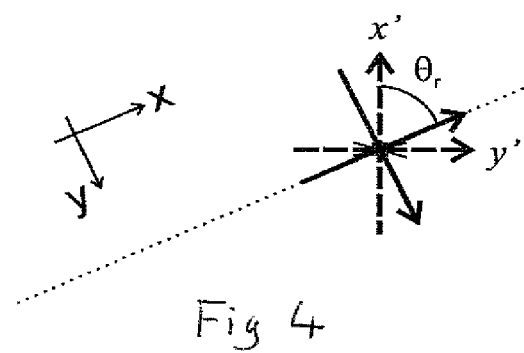
FIG. 4 is a diagram illustrating decomposition of a receiver.

In conventional acquisition, the electromagnetic fields due to the inline and broadside configurations are normally not acquired simultaneously. If towed with a substantial azimuth angle $\theta_s$ to the towing direction, inline and broadside data could be obtained simultaneously since the source then could be decomposed into a component parallel to the towing direction and a component normal to the towing direction (FIG. 5), and since the receivers usually are set up to register two orthogonal field components. This would require a determination of the orientation $\theta_r$ of the receivers (FIG. 4). Then, if the towing direction is defined as being along the x-axis, inline data are acquired for the source and receiver antennas pointing in the x-direction, and broadside data are acquired for the antenna components that are oriented normal to the towing direction.

It must be noted, however, that although simultaneous collection of inline and broadside data is an advantage, it is not a necessary requirement for the considerations that follow. The condition that must be satisfied is that the inline and broadside data are acquired along the same line.

In terms of the expressions in equation 5, the field components in the $\rho$-direction with azimuth angle $\beta = \{0, \pi\}$ can be considered as inline data, whereas the field components in the $\beta$-direction with azimuth angle $\beta = \{\pi/2, 3\pi/2\}$ can be considered as broadside data. Note that, when relating the formulas in equation 5 to an inline/broadside configuration with common offset direction, the dipole current moment Il must correspond to the dipole current moment along the offset direction (x-direction in FIG. 3) for the inline case and the dipole current moment normal to the offset direction (negative y-direction in FIG. 3) for the broadside case. Now, if a source antenna is towed at an angle with the tow-direction, i.e. the antenna-length vector, l, is pointing in a direction with angle $\theta_s$ with the x-direction, the dipole current moment in the inline case, $Il_{in}$, is given by the rotation $l_{in} = l \sin \theta_s$, and the dipole current moment in the broadside case, $Il_{br}$, is given by the rotation $l_{br} = l \sin \theta_s$, cf. FIG. 5.

Removal of Air-response

From equations 18 and 19 it is seen that the dominating air-response in the electric field component, $I^{TE}_{A0}$, $I^{TE}_{A1}$, have similar characteristics, and that the same similarity is present for the magnetic field, i.e., between $I^{TE}_{D0}$ and $I^{TE}_{D1}$. Now, consider equation 5. Since the dominant air-response contributions are TE modes, and since the zeroth- and first-order modes have a simple relation, the air-response can be removed from the data. It is assumed that the source-current moment has been decomposed into its inline and broadside components as described in section 7. Then we can construct the quantities $S_E$ and $S_H$ in equation 2.

Note that, if the current amplitude is different for the inline and broadside data, this must be accounted for in equation 3. The quantities in equation 2 describe an electric field response from the subsurface (equation 2a) and a magnetic field response from the subsurface (equation 2b) where the dominating part of the air-response has been removed. This does not correspond to a removal of the sea-surface effect from the field data since the "amplification" in terms of the horizontal electric field, and slight modification in terms of the horizontal magnetic field, of the subsurface signal due to the sea-surface interface is still present in the data. What this means is that both the electric and magnetic TM responses from a thin resistive layer in the subsurface are modified due to the multiples in the water column (cf. Løseth, 2007), but that the signals which have propagated in the air halfspace, i.e., the dominating TE-mode contributions due to the air region, have been removed. By inserting the expressions in equation 5 into equation 2, one gets $$S_E = -\frac{Il_{in}}{4\pi}\left[I^{TM}_{A0} - \frac{1}{2\rho}I^{TM}_{A1} + \frac{1}{2}\left(I^{TE}_{A0} + \frac{1}{\rho}I^{TE}_{A1}\right)\right], \quad (21a)$$

$$S_H = -\frac{Il_{in}}{4\pi}\left[I^{TM}_{D0} - \frac{1}{2\rho}I^{TM}_{D1} + \frac{1}{2}\left(I^{TE}_{D0} + \frac{1}{\rho}I^{TE}_{D1}\right)\right]. \quad (21b)$$

A motivation behind the formalism in equation 2 is evident when inserting the relations between the TE-mode responses in equation 18 into equation 21. If we assume that laterally propagating TE-mode responses from the subsurface are negligible, the expressions in equation 21, which have been obtained by combining inline and broadside data, are void of the TE-mode response from the air halfspace. Thus, in this case, i.e., if laterally propagating TE fields in the subsurface are negligible, the responses $S_E$ for the electric field and $S_H$ for the magnetic field, are TM-mode responses. It has been shown in Løseth (2007) that a response from a thin resistive layer in the subsurface can be ascribed to the TM mode, and that the presence of the sea-surface interface leads to enhanced subsurface TM-responses.

However, certain CSEM models will lead to laterally propagating TE fields in the subsurface. In this case, the quantities $S_E$ and $S_H$ will contain both TE- and TM-mode responses from the subsurface. However, the procedure in equation 2 still leads to a removal of the unwanted air-responses.

Air-response Removal when the Seabed has Varying Topography

Figure 6:
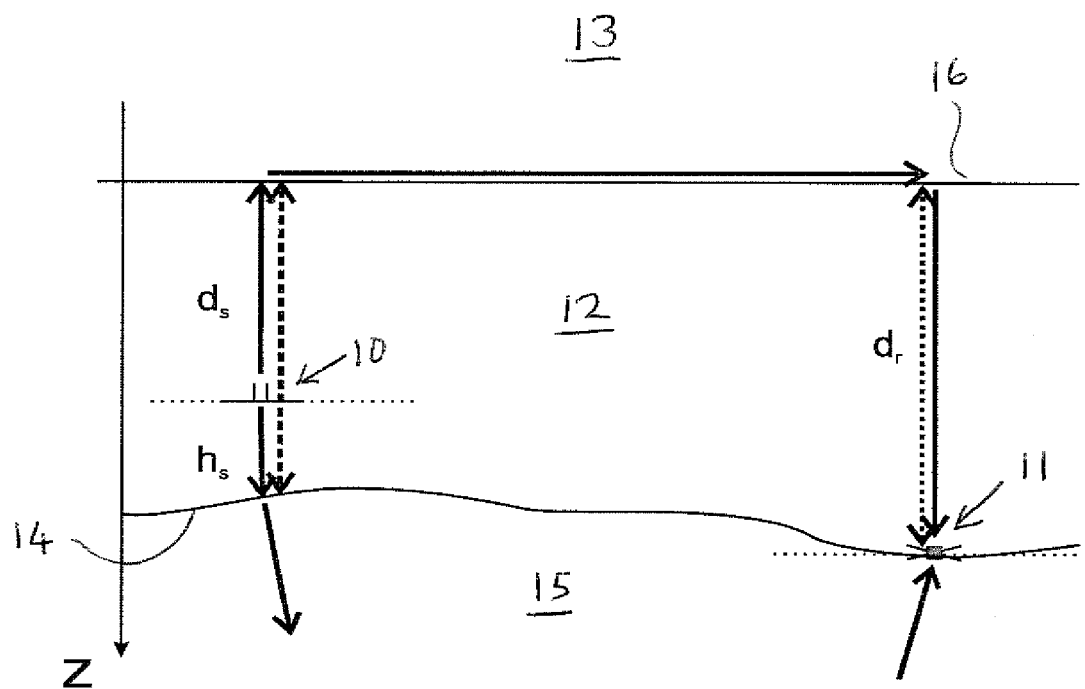
FIG. 6 is a diagram similar to FIG. 1 but for a model where the seabed has varying topography.

In real scenarios, the seabed and subsurface are not stratified. However, the approximation of the sea-surface as stratified is in general very good. Moreover, the formulas in equation 19 suggest that the multiples are generated both at the source side and at the receiver side. Thus, the formulas can be adjusted for a nonstratified subsurface as:

$$I^{TE}_{A0} \cong -\frac{1}{\rho}I^{TE}_{A1,b} \approx \frac{2e^{ik(d_s+d_r)}}{\sigma\rho^3}\frac{1+R^s_{sb}e^{2ikh_s}}{1-R^s_{sb}e^{2ik(d_s+h_s)}} \quad (22a)$$

$$\frac{1+R^r_{sb}e^{2ikh_r}}{1-R^r_{sb}e^{2ik(d_r+h_r)}}$$

$$I^{TE}_{D0} \cong -\frac{1}{\rho}I^{TE}_{D1,b} \approx -\frac{2e^{ik(d_s+d_r)}}{ik\rho^3}\frac{1+R^s_{sb}e^{2ikh_s}}{1-R^s_{sb}e^{2ik(d_s+h_s)}} \quad (22b)$$

$$\frac{1-R^r_{sb}e^{2ikh_r}}{1-R^r_{sb}e^{2ik(d_r+h_r)}}$$

where the relation in equation 20 has been inserted into equation 19. The seawater layer thickness $d_w$ has furthermore been written in terms of the thickness at the source location $d_s+h_s$ and receiver location $d_r+h_r$. The reflection response at the source side is denoted $R_{sb}^s$ whereas the reflection response at the receiver side is denoted $R_{sb}^r$. The signal propagation can be interpreted as suggested in FIG. 6. Note that the definitions of TE- and TM-mode responses in terms of reflection and transmission in stratified media, are ambiguous when the subsurface media are not stratified. However, as long as the assumption of a stratified sea-surface is a good approximation, the relations in equation 22 are valid. Thus, the suggested method for removing the air-response as described in equation 2 can be used for real marine CSEM/SBL data.

It should furthermore be noted that in the air-response expressions in equation 22, the implicit assumption of homogeneous seawater conductivity might lead to erroneous results when the conductivity in the seawater column varies. However, in such cases, the approximation of conductivity changes as those of stratified layers is most often sufficient. Then, the expressions in equation 22 can be modified to take into account vertical transmission and reflection in the stack of layers in the water column. However, the equations for removal of the air-effect (equation 2) still hold since the gradient effects in the seawater layer are the same for both the inline and broadside data.

The expressions in equation 22 with their relations to the field components (equation 5) also suggest how air-responses can be removed from survey data if no broadside data are available. This requires that the seawater and subsurface conductivities are known.

Numerical Examples

Numerical simulations that verify the theoretical predictions that the dominating air-response can be removed from a marine CSEM/SBL data set if both inline and broadside data are available are presented herein. The simulations have been done for two stratified models where the first case is a simple model that simulates shallow water conditions with a thin resistive layer in the subsurface, and where the second case presents a more complex subsurface model with several layers. The models that have been used are presented in Table 1 for the simple model and Table 2 for the "complicated" model. In addition to modelling examples for stratified media, a 2-D model with varying seabed topography along the receiver line has been considered.

For the stratified modelling results presented in FIGS. 7-10, the curve 1 is the total inline field, the curve 2 is the inline field for a simple model without the air halfspace, i.e., a seawater halfspace above the subsurface structure. The curves 3 and 4 show, respectively, the TE and TM modes for the inline configuration, and the curve 5 shows the constructed inline and broadside response which suppresses the air-response effect. The left hand side of the figures shows off-reservoir responses, i.e., the parameters $\sigma_1$ in Tables 1 and 2 have been used. The right hand side of the figures shows the responses when the reservoir is resistive, i.e. the parameters $\sigma_h$ in Tables 1 and 2 have been used.

Figure 7A:
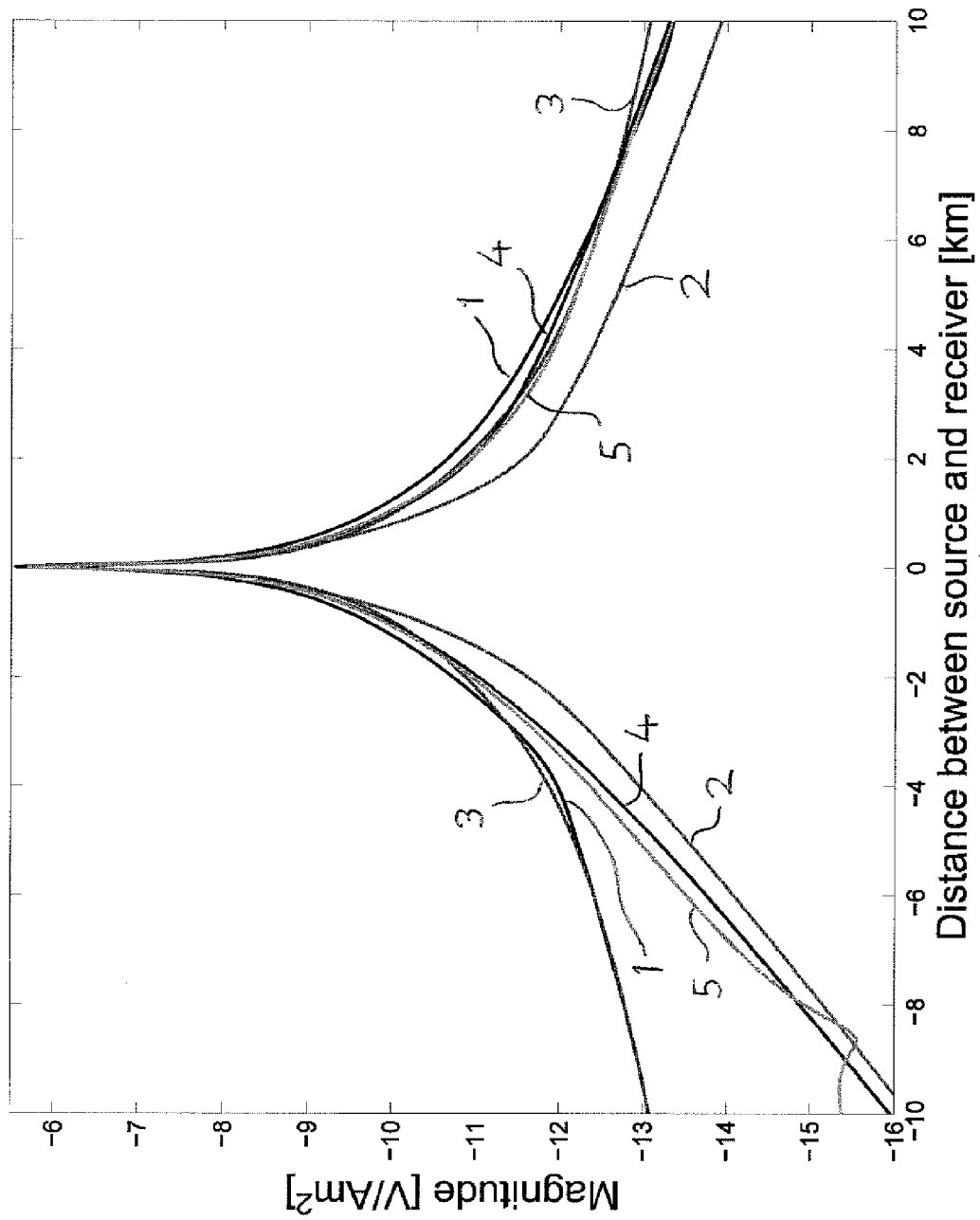
FIGS. 7a and 7b are graphs illustrating magnitude-versus-offset (MVO) and phase-versus-offset (PVO) from an electric field responses in a simple model.
Figure 7B:
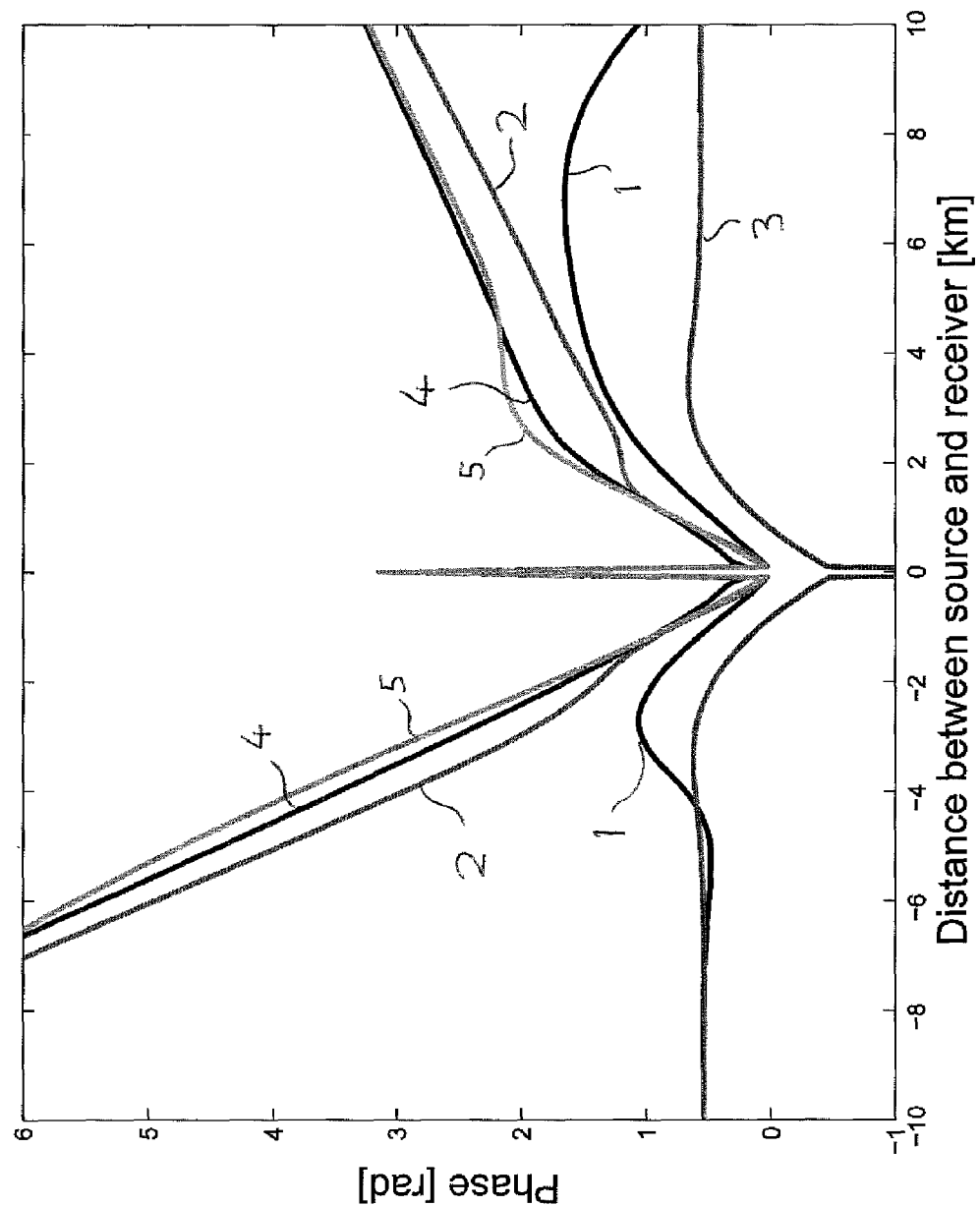

FIGS. 7a and 7b show the magnitude-versus-offset (MVO) and phase-versus-offset (PVO) for the electric field in the simple model scenario. In this case the constructed inline/broadside response (IB-response) 5 matches the TM response 4 above the resistive reservoir. Note that the IB-response has a different weighting of the TM modes than the inline TM response (cf. equations 21a and 5). It is also evident from the right hand side of FIG. 7a that the sea-surface leads to an enhanced TM response from the subsurface for the electric field. The left hand side contains responses in a model with a water column with an air halfspace above and a sediment halfspace below. At far offsets the part of the air-response that has not been removed by the IB air-removal procedure appears. This response is very small in magnitude, and is due to terms in the asymptotic expansion of the TE-mode air-response that are not equal for the $I^{TE}_{A0}$ and $I^{TE}_{A1}$ expressions, cf. equation 16.

Figure 8A:
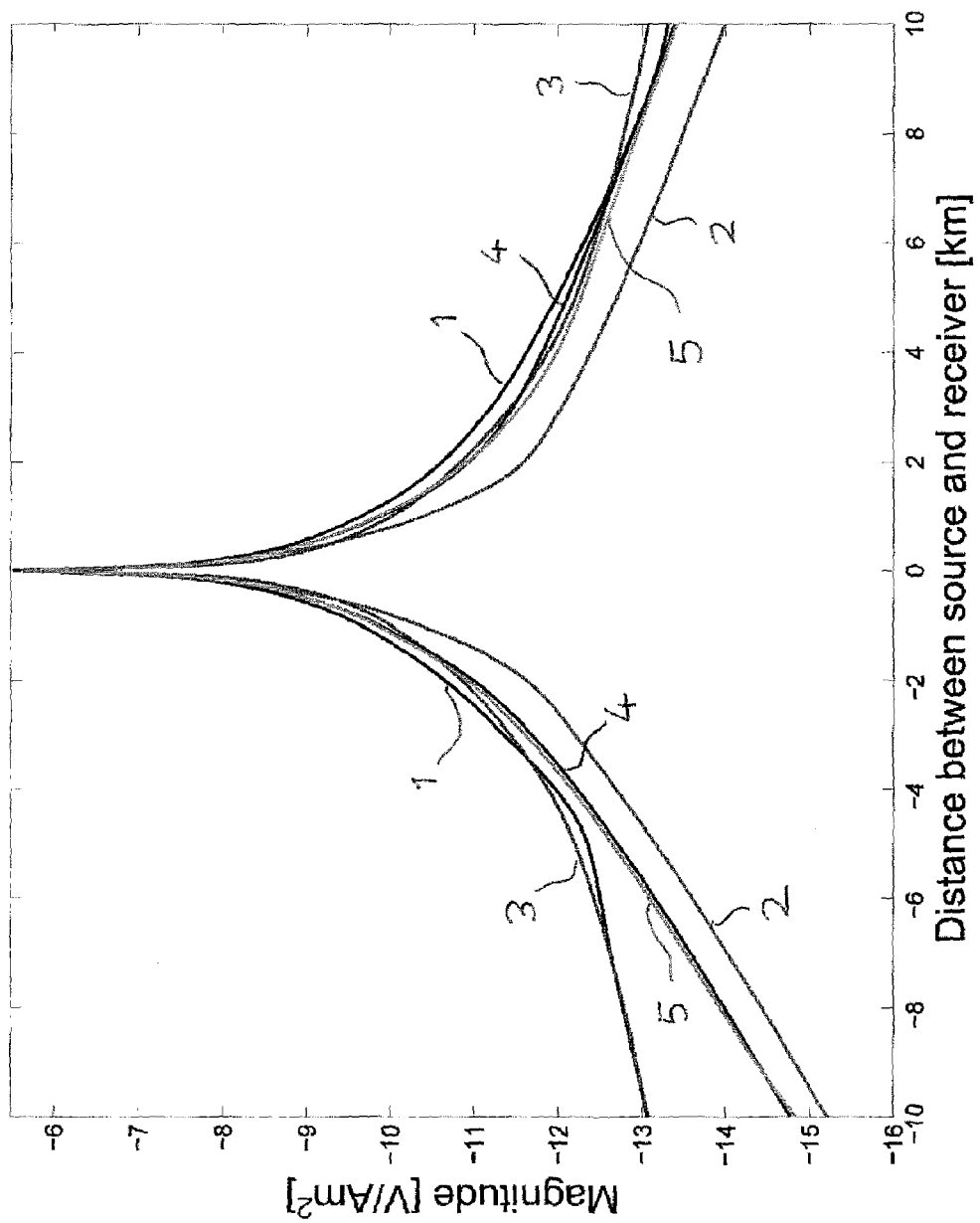
FIGS. 8a and 8b are graphs illustrating MVO and PVO, respectively, for electric field responses in a more complex model.
Figure 8B:
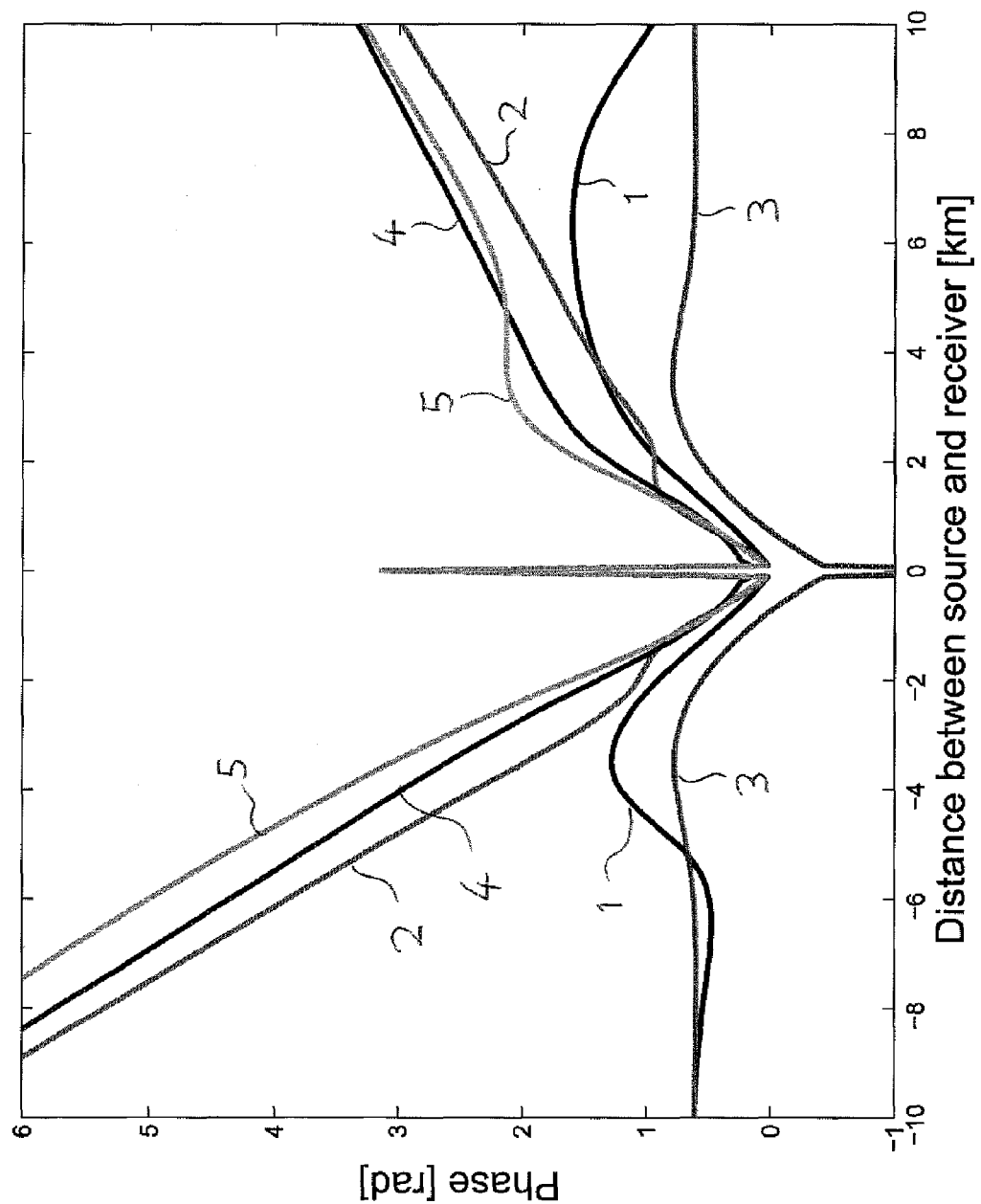

In the more complex model, the electric field with the MVO plot in FIG. 8a and the PVO plot in FIG. 8b show a similar behavior as in the simple case, but now, the air-response remainder is hardly evident on the left hand sideplot since the subsurface response is stronger for the off-reservoir settings in this case. The right hand side again demonstrate the TM dominance in the IB combined data. This TM response can be directly ascribed to the thin resistive layer.

Figure 9A:
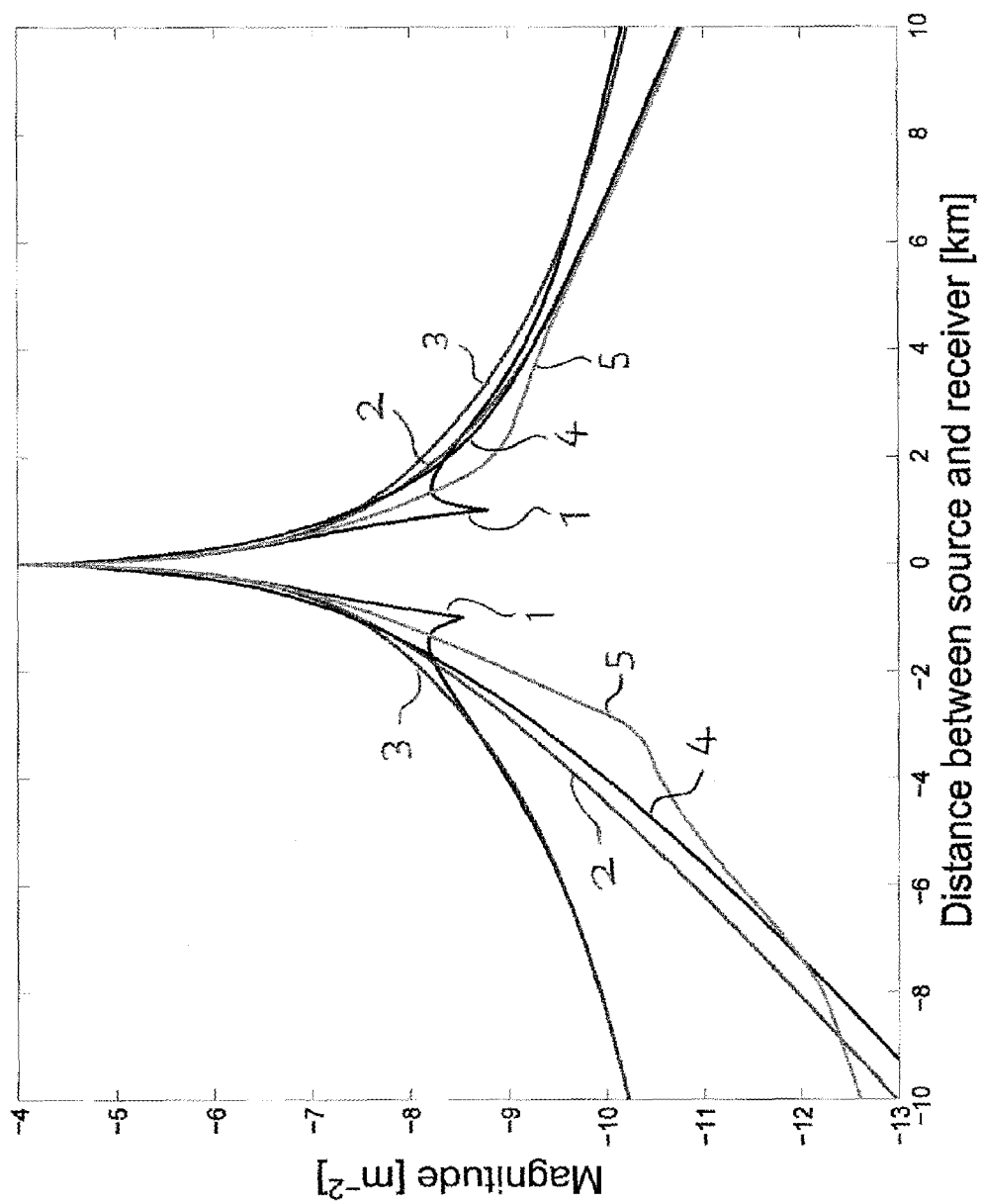

FIGS. 9a and b show the magnitude and phase plots, respectively, for the magnetic field in the simple model scenario. The same IB-removal effect as for the electric field is also evident in the magnetic data. However, the magnetic field TM amplitude is not amplified due to the sea-surface. This is due to the negative sign in equation 22b in the expressions for the multiples (compared to equation 22a which has only positive signs). Depending on the water depth, the magnetic field TM amplitude from the reservoir is either slightly increased or decreased in shallow water. Except for the lack of amplification, the behavior of the magnetic field is similar to the electric field. The on-reservoir IB-combined response 5 follows the TM-mode response 4 from the thin resistive layer, whereas the off-reservoir side has a characteristic lowering of amplitude for intermediate offsets and a small remaining TE-mode air-response which is evident at far-offsets. At the intermediate offsets, the left hand side shows that the lateral TE field below the seabed, which has not been removed by the IB-procedure, and the lateral TM field, are cancelling each other.

Figure 10A:
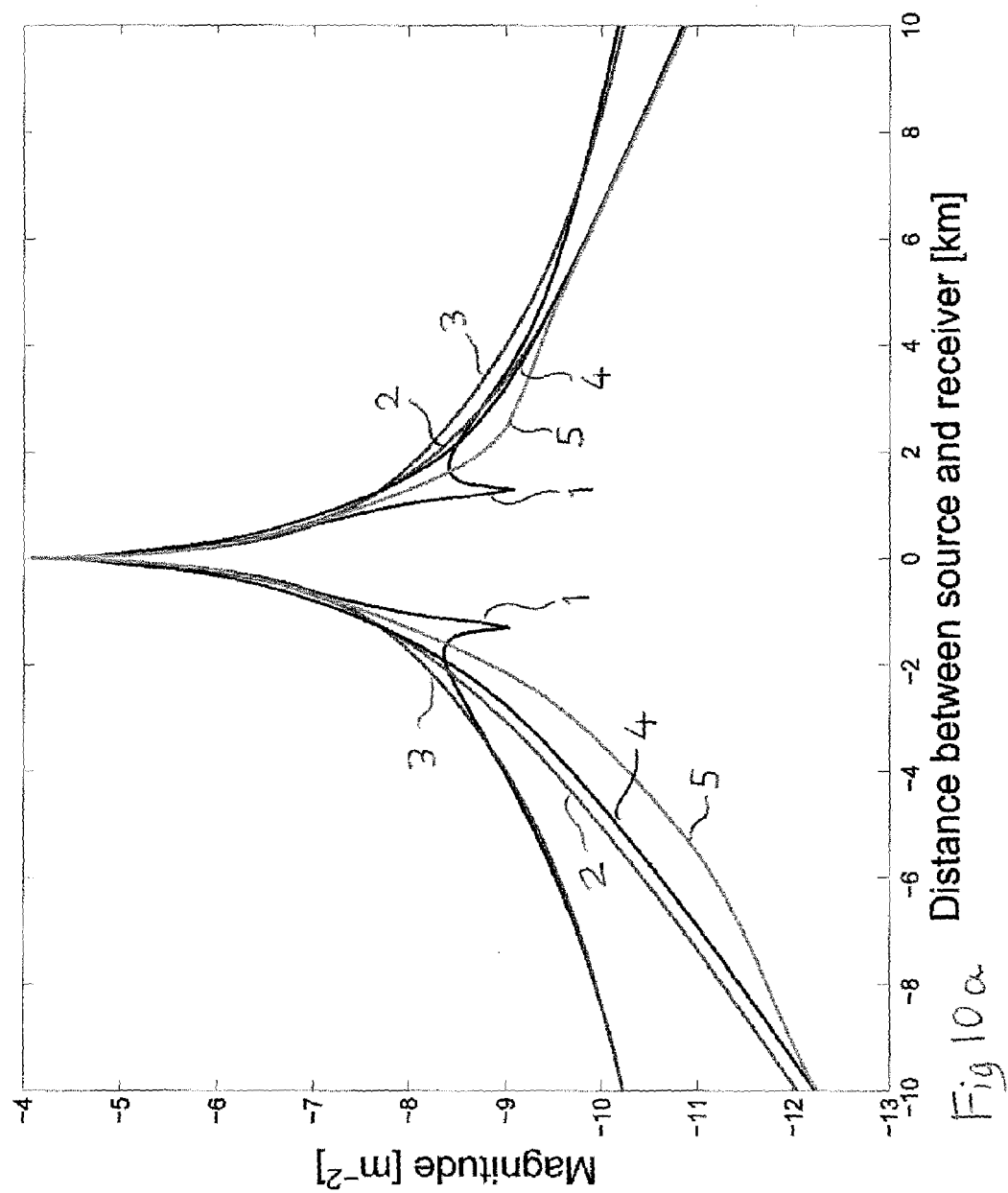
FIGS. 10a and 10b are graphs illustrating MVO and PVO, respectively, for magnetic field responses in the more complex model.
Figure 10B:
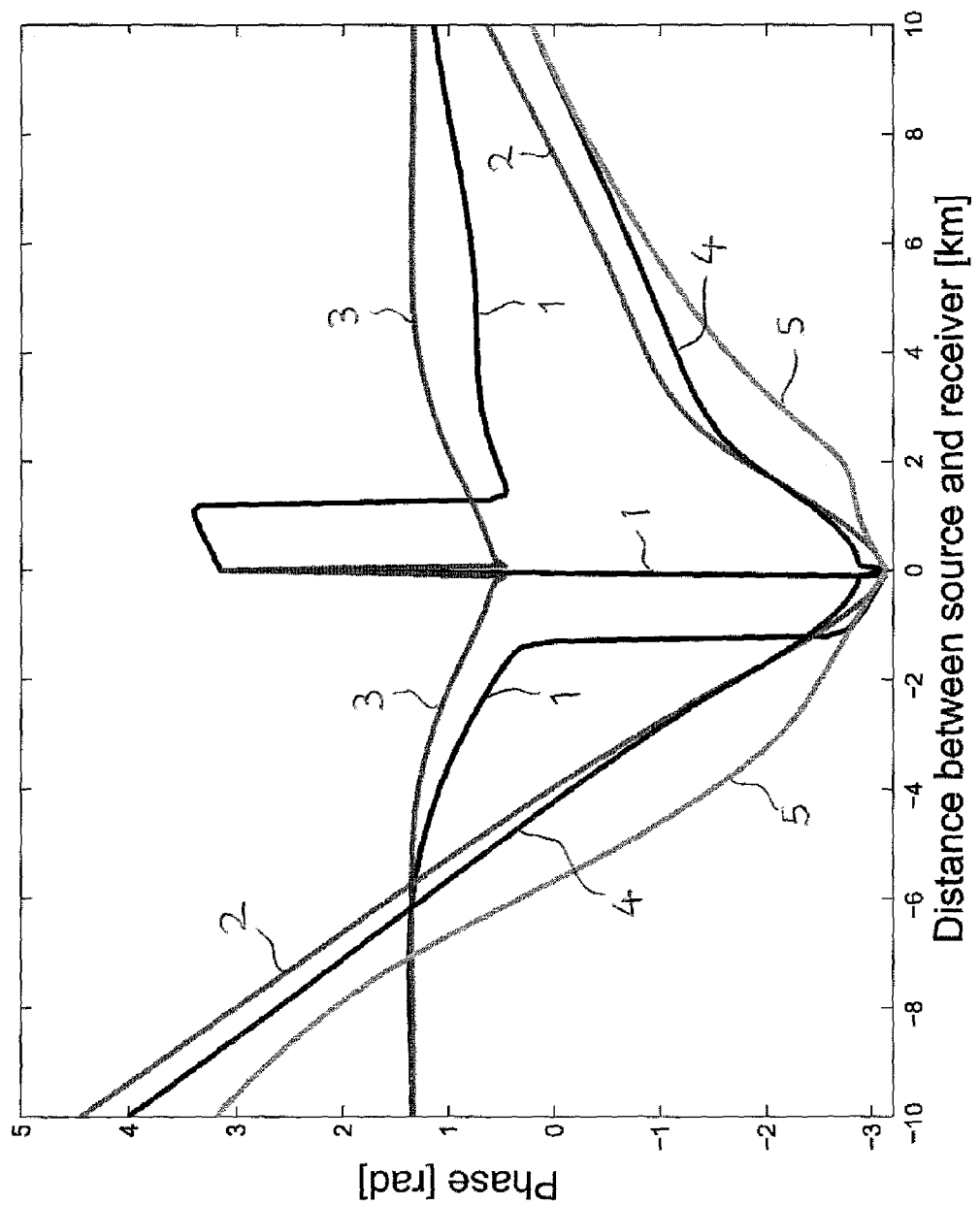
Figure 11A:
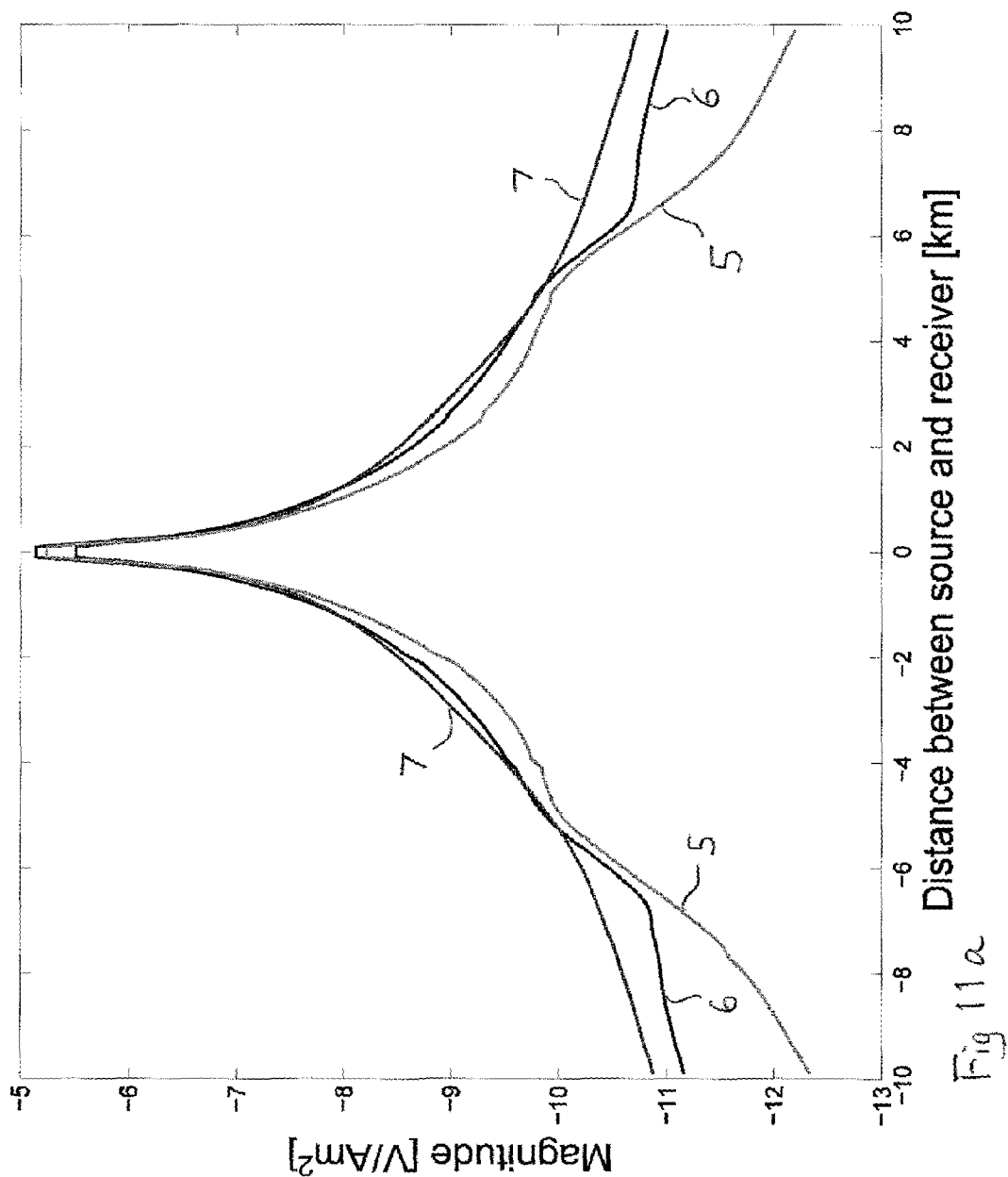
FIGS. 11a and 11b are graphs illustrating MVO and PVO, respectively, for electric field responses in a three-dimensional model.
Figure 11B:
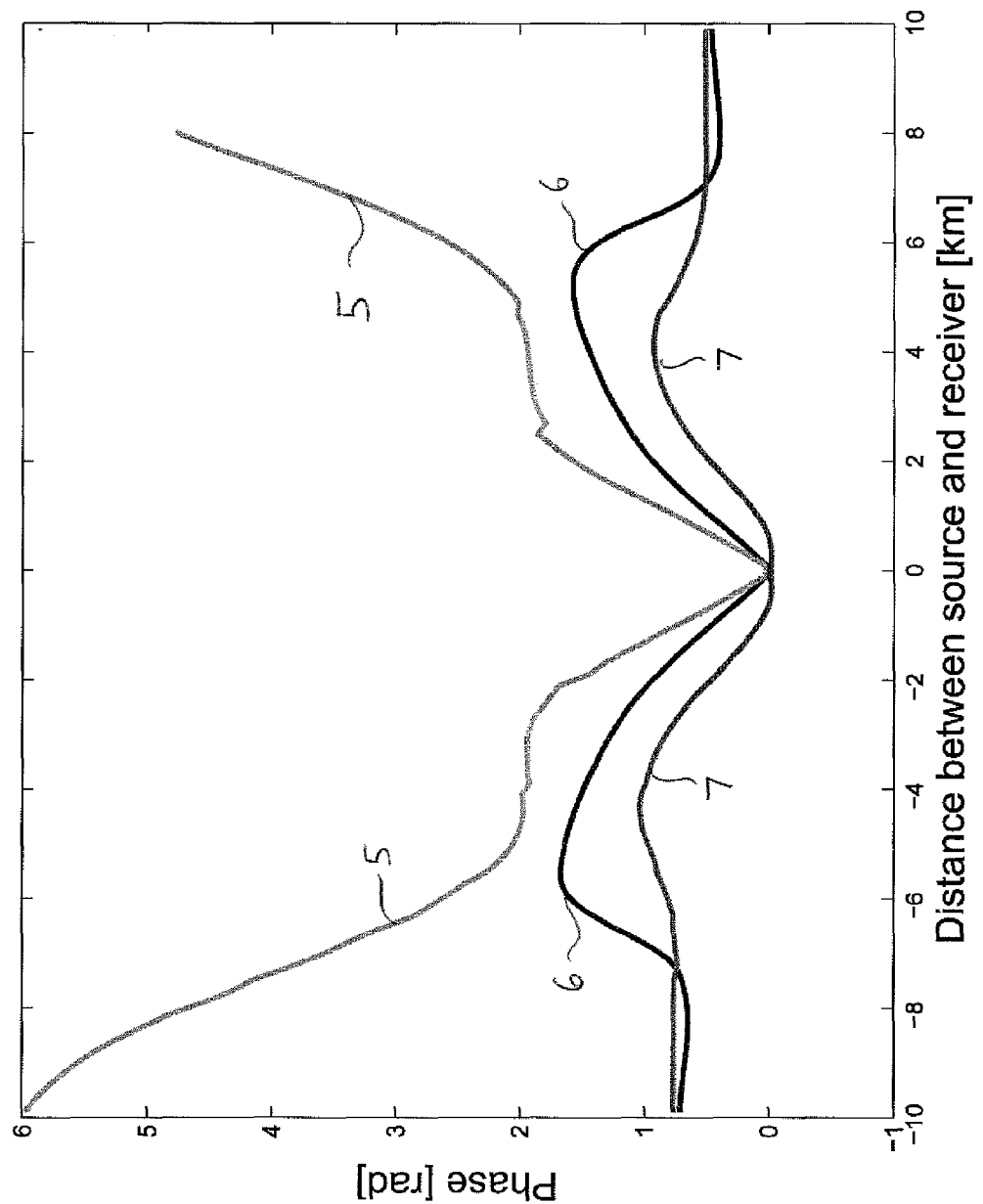
Figure 12A:
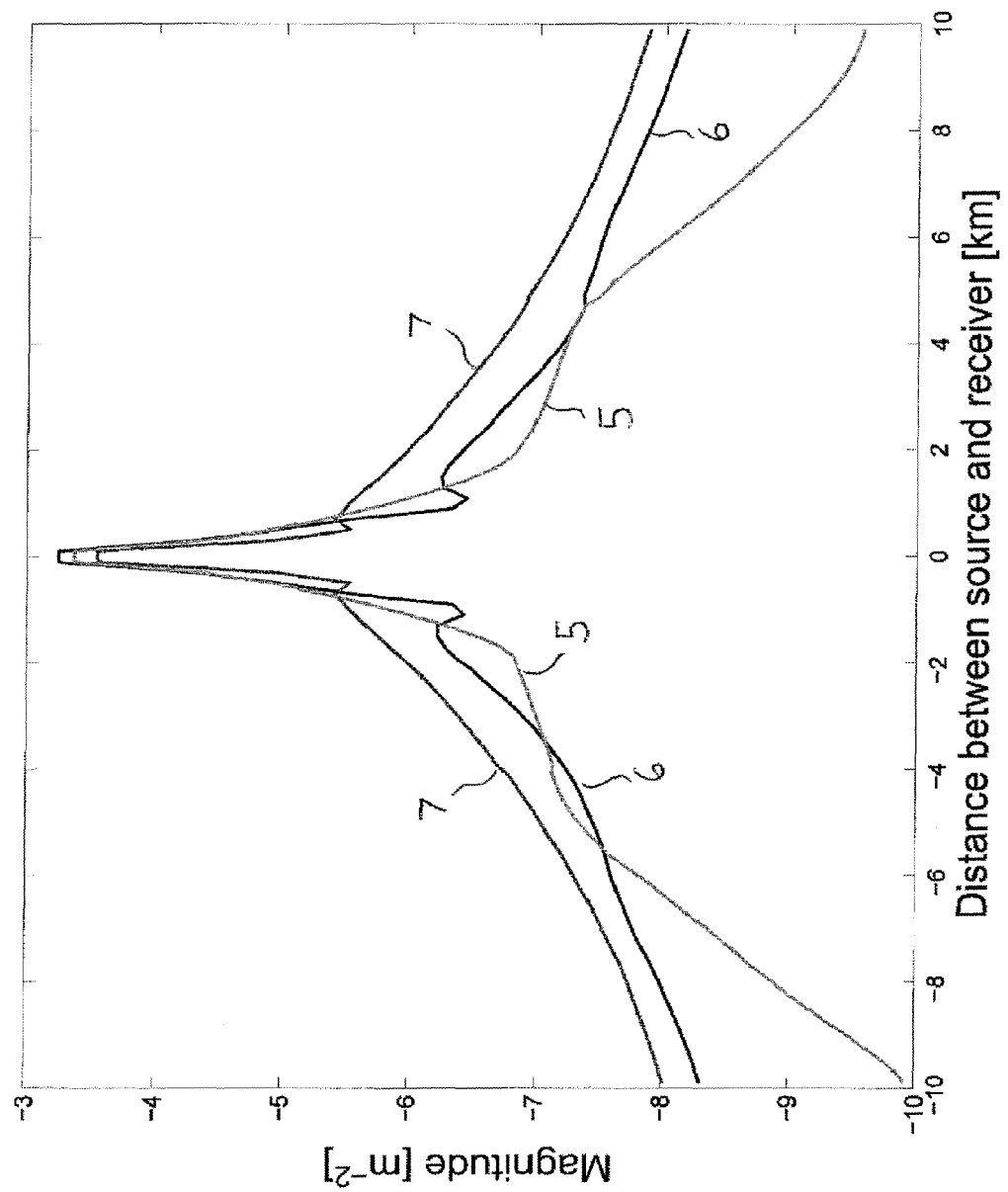
FIGS. 12a and 12b are graphs illustrating MVO and PVO, respectively, for magnetic field responses in the three-dimensional model.
Figure 12B:
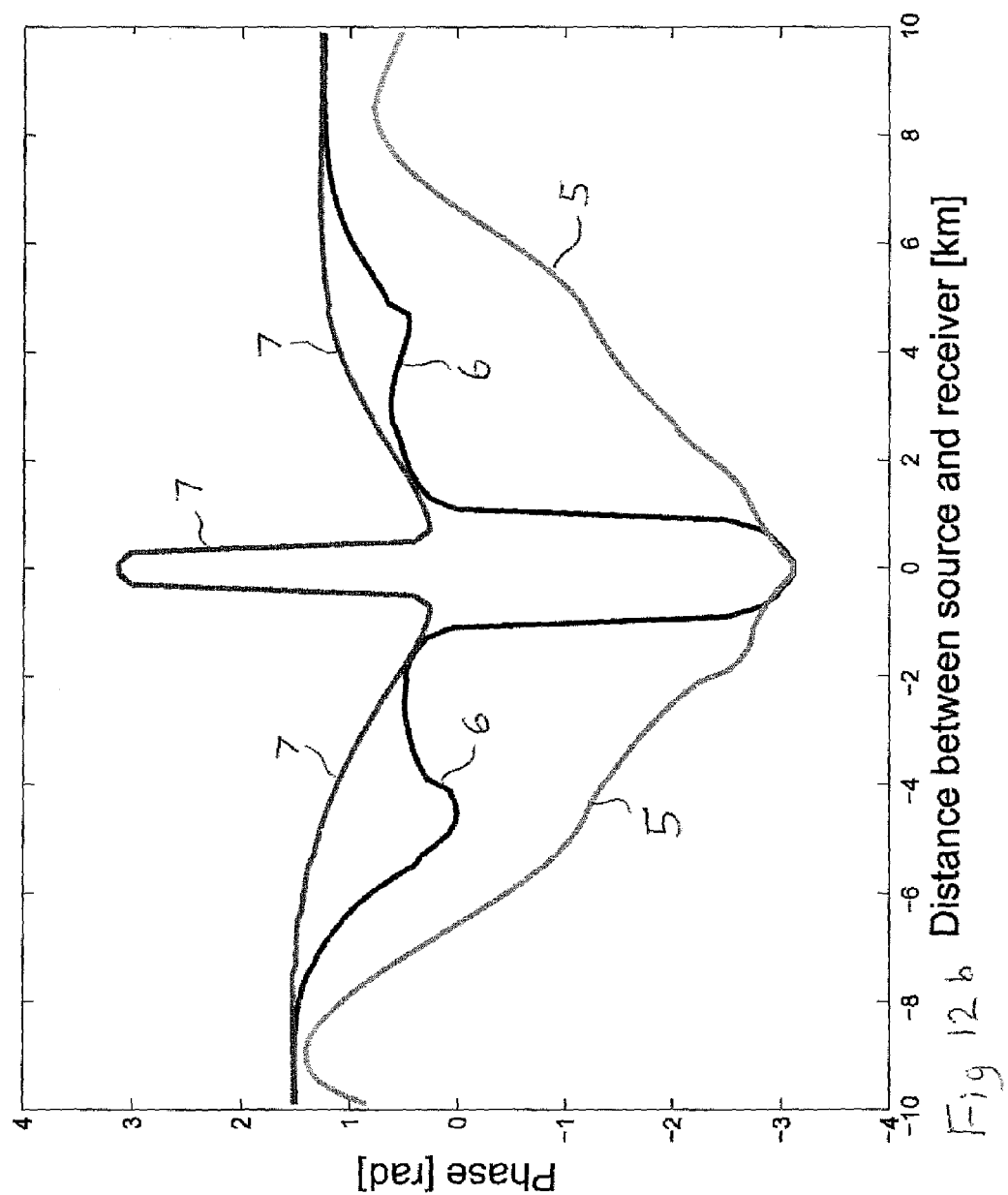

The magnetic field behavior in the complex model is shown in FIGS. 10a and 10b. The same trends as in the simple model are present for this case as well, but now the off-reservoir subsurface response dominates the small remaining TE air-response. The left hand side thus represents a sum of lateral TE and TM fields, which, due to opposite phases, makes the overall IB-magnitude smaller. On the right hand side, the TM mode due to the thin resistive layer is evident in the IB-data.

That the formalism also works for a seabed with varying topography is evident in FIGS. 11a, 11b, 12a and 12b which show the electric and magnetic field responses, respectively, for a model where the seabed varies from depth 80 m to 200 m. In this model, the background model is similar to the simple model presented in Table 1, and the resistive reservoir extends from −5 km to 5 km along the receiver line. The seabed has a positive slope along the towline, from 200 m seawater-layer thickness at the leftmost receiver position, 100 m thickness at the source position, and 80 m thickness at the rightmost receiver position. It can be observed in the figures that the signature from the resistive reservoir is evident in the inline data 6, but that the air-response is large. In the broadside data 7, the dominance of the air-response is larger than for the inline data. It can be noted that the plots are not symmetric due to the sloping seabed. The suggested combination of inline and broadside data as in equation 2 removes the dominating air-response from the plots, and the reservoir is clearly evident in the IB-combined plots 5.

It is noted that, when performing the IB air-response removal procedure for real marine CSEM/SBL data, the method should be accompanied by forward modelling that corresponds to the responses from the IB-combination routine in equation 2.

Conclusions

A new method for removing the air-response from marine CSEM or SBL data has been proposed. The method is suggested by the similarity of the spatial expressions that represent the air-response contribution in inline and broadside (IB) data. Thus, by an appropriate combination of IB-data as in equation 2, the resulting data represent a subsurface response that is at least substantially void of the dominating TE air-response. When the method is applied for electric field components, the presence of the sea-surface enhances a thin resistive layer TM response. The sea-surface in this case acts as an amplifier of the subsurface data. In the off-reservoir case, the electric field represents the interaction between the lateral TE and TM fields in the subsurface.

If the IB-removal procedure is applied to magnetic field data, the resulting responses are similar to the TM response from the thin resistive layer. In this case, the presence of the sea-surface modifies the resulting data only slightly. In the off-reservoir case, the combination of lateral TE- and TM-mode fields leads to lowering of the amplitude compared to a pure lateral TM mode response.

The suggested air-response removal procedure provides a simple method for constructing field data that are dominated by the subsurface response even in shallow water. The method requires that both inline and broadside field data are acquired.

If there is no, or only some, broadside data available, the formulas in equation 22 along with the field expressions in equation 5 suggest how the air-response can be removed from field data if the seawater and apparent seabed conductivities are known.

The aforementioned methods, including one or more steps of the aforementioned methods, may be implemented by utilizing a computer and/or a computer readable medium according to various embodiments. Various modifications may be made within the scope of the invention herein described.

References

Amundsen, L., Løseth, L. O., Mittet, R., Ellingsrud, S., and Ursin, B. (2006). Decomposition of electromagnetic fields into upgoing and downgoing components. *Geophysics*, 71(5):G211-G223.

Bannister, P. R. (1984). New simplified formulas for ELF subsurface-to-subsurface propagation. *IEEE Journal of Oceanic Engineering*, OE-9(3):154-163.

Baños, A. (1966). *Dipole Radiation in the Presence of a Conducting Half-Space*. Pergamom Press, Oxford.

Eidesmo, T., Ellingsrud, S., MacGregor, L. M., Constable, S. C., Sinha, M. C., Johansen, S., Kong, F. N., and Westerdahl, H. (2002). SeaBed Logging (SBL), a new method for remote and direct identification of hydrocarbon filled layers in deepwater areas using controlled source electromagnetic sounding. *First Break*, 20:144-152.

Løseth, L. O. (2007). Modelling of Controlled Source Electromagnetic Data. PhD Thesis, NTNU.

Løseth, L. O., Pedersen, H. M., Ursin, B., Amundsen, L., and Ellingsrud, S. (2006). Low-frequency electromagnetic fields in applied geophysics: Waves or diffusion? *Geophysics*, 71(4): W29-W40.

Løseth, L. O. and Ursin, B. (2007). Electromagnetic fields in planarly layered anisotropic media. *Geophyisical Journal International*, 170(1):44-80.

Lu, X., Srnka, L. J., and Carazzone, J. J. (2005). Method for removing air wave effect from offshore frequency domain controlled-source electromagnetic data. WO2005/010560.

Morse, P. M. and Feshbach, H. (1953). *Methods of Theoretical Physics*. McGraw-Hill, New York.

Stamnes, J. J. (1986). *Waves in Focal Regions*. Adam Hilger, Bristol.

Wait, J. R. (1961). The electromagnetic fields of a horizontal dipole in the presence of a conducting half-space. *Canadian Journal of Physics*, 39:1017-1028.

TABLE 1

Parameters used in the simple modelling examples.

| Layer | σl (S/m) | σh (S/m) | thickness (m) |
|---|---|---|---|
| sea | 3.50 | 3.50 | 100 |
| 1 | 1.00 | 1.00 | 1000 |
| 2 | 1.00 | 0.01 | 100 |
| 3 | 1.00 | 1.00 | |

TABLE 2

Parameters used in for the "complicated" model.

| Layer | σl (S/m) | σh (S/m) | thickness (m) |
|---|---|---|---|
| sea | 3.50 | 3.50 | 100 |
| 1 | 0.40 | 0.40 | 100 |
| 2 | 1.20 | 1.20 | 500 |
| 3 | 0.60 | 0.60 | 400 |
| 4 | 0.30 | 0.01 | 100 |
| 5 | 0.50 | 0.50 | |

The invention claimed is:

1. A method of processing marine controlled source electromagnetic data, comprising the steps of:
   providing inline and broadside marine controlled source electromagnetic data comprising inline and broadside electromagnetic field components; and
   forming a linear combination of the inline and broadside field components to reduce airwave content,
   wherein the inline and broadside data comprise inline and broadside electric data comprising inline and broadside electric field components, and
   wherein the step of forming the linear combination comprises forming a difference between the inline electric field component(s) and weighted broadside electric field component(s), the weighted broadside electric field component(s) being weighted by a first weighting factor.

2. The method of claim 1, wherein the step of providing inline and broadside marine controlled source electromagnetic data comprises rotating horizontal electromagnetic field component data to provide the inline and broadside data.

3. The method of claim 1, wherein the first weighting factor is equal or proportional to an inline dipole moment of an electromagnetic source used to obtain the inline electric data divided by twice a broadside dipole moment of an electromagnetic source used to obtain the broadside electric data.

4. The method of claim 3, wherein the second weighting factor is equal or proportional to an inline dipole moment of an electromagnetic source used to obtain the inline magnetic data divided by twice a broadside dipole moment of an electromagnetic source used to obtain the broadside magnetic data.

5. The method of claim 3, wherein the inline and broadside data are obtained from a common controlled electromagnetic source, the common source comprising a horizontal electric dipole having a dipole moment oriented with respect to an inline direction at an angle which is different from 0 and every integer multiple of π/2 radians, the inline and broadside dipole moments comprising inline and broadside components, respectively, of the dipole moment.

6. The method of claim 4, wherein the inline and broadside data are obtained from a common controlled electromagnetic source, the common source comprising a horizontal electric dipole having a dipole moment oriented with respect to an inline direction at an angle which is different from 0 and every integer multiple of π/2 radians, the inline and broadside dipole moments comprising inline and broadside components, respectively, of the dipole moment.

7. The method of claim 1, wherein the inline and broadside data are obtained from a common controlled electromagnetic source.

8. The method of claim 7, wherein the common source comprises a horizontal electric dipole whose dipole moment is oriented with respect to an inline direction at an angle which is different from 0 and every integer multiple of π/2 radians.

9. A method of processing marine controlled source electromagnetic data, comprising the steps of:
   providing inline and broadside marine controlled source electromagnetic data comprising inline and broadside electromagnetic field components; and
   forming a linear combination of the inline and broadside field components to reduce airwave content,
   wherein the inline and broadside data comprise inline and broadside magnetic data comprising inline and broadside magnetic field components, and
   wherein the step of forming the linear combination comprises forming a sum of the inline magnetic field component(s) and weighted broadside magnetic field component(s), the weighted broadside magnetic field components(s) being weighted by a second weighting factor.

10. The method of claim 9, wherein the step of providing inline and broadside marine controlled source electromagnetic data comprises rotating horizontal electromagnetic field component data to provide the inline and broadside data.

11. The method of claim 9, wherein the inline and broadside data are obtained from a common controlled electromagnetic source.

12. The method of claim 11, wherein the common source comprises a horizontal electric dipole whose dipole moment is oriented with respect to an inline direction at an angle which is different from 0 and every integer multiple of π/2 radians.

13. A computer program embodied on a non-transitory computer-readable medium for controlling a computer to perform a method of processing marine controlled source electromagnetic data, the method comprising:

providing inline and broadside marine controlled source electromagnetic data comprising inline and broadside electromagnetic field components; and forming a linear combination of the inline and broadside field components to reduce airwave content, wherein the inline and broadside data comprise at least one of inline and broadside electric data comprising inline and broadside electric field components or inline and broadside magnetic data comprising inline and broadside magnetic field components, and wherein the step of forming the linear combination comprises at least one of forming a difference between the inline electric field component(s) and weighted broadside electric field component(s), the weighted broadside electric field component(s) being weighted by a first weighting factor or forming a sum of the inline magnetic field component(s) and weighted broadside magnetic field component(s), the weighted broadside magnetic field components(s) being weighted by a second weighting factor.

14. A non-transitory computer-readable medium comprising instructions for performing a method on a computer of processing marine controlled source electromagnetic data, the method comprising:

providing inline and broadside marine controlled source electromagnetic data comprising inline and broadside electromagnetic field components; and forming a linear combination of the inline and broadside field components to reduce airwave content, wherein the inline and broadside data comprise at least one of inline and broadside electric data comprising inline and broadside electric field components or inline and broadside magnetic data comprising inline and broadside magnetic field components, and wherein the step of forming the linear combination comprises at least one of forming a difference between the inline electric field component(s) and weighted broadside electric field component(s), the weighted broadside electric field component(s) being weighted by a first weighting factor or forming a sum of the inline magnetic field component(s) and weighted broadside magnetic field component(s), the weighted broadside magnetic field components(s) being weighted by a second weighting factor.

15. An apparatus comprising:

a computer programmed by a computer program embodied on a non-transitory computer-readable medium for controlling the computer to perform a method of processing marine controlled source electromagnetic data by:

providing inline and broadside marine controlled source electromagnetic data comprising inline and broadside electromagnetic field components; and forming a linear combination of the inline and broadside field components to reduce airwave content, wherein the inline and broadside data comprise at least one of inline and broadside electric data comprising inline and broadside electric field components or inline and broadside magnetic data comprising inline and broadside magnetic field components, and wherein the step of forming the linear combination comprises at least one of forming a difference between the inline electric field component(s) and weighted broadside electric field component(s), the weighted broadside electric field component(s) being weighted by a first weighting factor or forming a sum of the inline magnetic field component(s) and weighted broadside magnetic field component(s), the weighted broadside magnetic field components(s) being weighted by a second weighting factor.

16. A system for processing marine controlled source electromagnetic data comprising:

a computer including at least one data processor; and a non-transitory computer-readable medium programmed with instructions to cause the computer to:

provide inline and broadside marine controlled source electromagnetic data comprising inline and broadside electromagnetic field components; and form a linear combination of the inline and broadside field components to reduce airwave content, wherein the inline and broadside data comprise at least one of inline and broadside electric data comprising inline and broadside electric field components or inline and broadside magnetic data comprising inline and broadside magnetic field components, and wherein the step of forming the linear combination comprises at least one of forming a difference between the inline electric field component(s) and weighted broadside electric field component(s), the weighted broadside electric field component(s) being weighted by a first weighting factor or forming a sum of the inline magnetic field component(s) and weighted broadside magnetic field components), the weighted broadside magnetic field components(s) being weighted by a second weighting factor.

\* \* \* \* \*